(12) United States Patent
Chen et al.

(10) Patent No.: US 10,972,738 B2
(45) Date of Patent: Apr. 6, 2021

(54) VIDEO ENCODING APPARATUS HAVING RECONSTRUCTION BUFFER WITH FIXED SIZE AND/OR BANDWIDTH LIMITATION AND ASSOCIATED VIDEO ENCODING METHOD

(71) Applicant: MEDIATEK INC., Hsin-Chu (TW)

(72) Inventors: Li-Heng Chen, Hsin-Chu (TW); Tung-Hsing Wu, Hsin-Chu (TW); Yi-Hsin Huang, Hsin-Chu (TW); Lien-Fei Chen, Hsin-Chu (TW); Ting-An Lin, Hsin-Chu (TW); Han-Liang Chou, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 112 days.

(21) Appl. No.: 16/367,237

(22) Filed: Mar. 27, 2019

(65) Prior Publication Data

US 2019/0306510 A1   Oct. 3, 2019

Related U.S. Application Data

(60) Provisional application No. 62/649,626, filed on Mar. 29, 2018.

(51) Int. Cl.
*H04N 19/159* (2014.01)
*H04N 19/15* (2014.01)
*H04N 19/105* (2014.01)
*H04N 19/172* (2014.01)
*H04N 19/184* (2014.01)
*H04N 19/463* (2014.01)

(52) U.S. Cl.
CPC .......... *H04N 19/15* (2014.11); *H04N 19/105* (2014.11); *H04N 19/159* (2014.11); *H04N 19/172* (2014.11); *H04N 19/184* (2014.11); *H04N 19/463* (2014.11)

(58) Field of Classification Search
CPC ..................................................... H04N 19/15
USPC ........................................................ 375/240
See application file for complete search history.

(56) References Cited

U.S. PATENT DOCUMENTS

2015/0091920 A1\* 4/2015 Rygh ........................ G06T 1/20
  345/522
2015/0264358 A1\* 9/2015 Moriya ................ H04N 19/174
  375/240.02

\* cited by examiner

*Primary Examiner* — Amir Shahnami
(74) *Attorney, Agent, or Firm* — Winston Hsu

(57) ABSTRACT

A video encoding apparatus includes a data buffer and a video encoding circuit. Encoding of a first frame includes: deriving reference pixels of a reference frame from reconstructed pixels of the first frame, respectively, and storing reference pixel data into the data buffer for inter prediction, wherein the reference pixel data include information of pixel values of the reference pixels. Encoding of a second frame includes performing prediction upon a coding unit in the second frame to determine a target predictor for the coding unit. The prediction performed upon the coding unit includes: checking if a search range on the reference frame for finding a predictor of the coding unit under an inter prediction mode includes at least one reference pixel of the reference frame that is not accessible to the video encoding circuit, and determining the target predictor for the coding unit according to a checking result.

20 Claims, 19 Drawing Sheets

VIDEO ENCODING APPARATUS HAVING RECONSTRUCTION BUFFER WITH FIXED SIZE AND/OR BANDWIDTH LIMITATION AND ASSOCIATED VIDEO ENCODING METHOD

CROSS REFERENCE TO RELATED APPLICATIONS

This application claims the benefit of U.S. provisional application No. 62/649,626, filed on Mar. 29, 2018 and incorporated herein by reference.

BACKGROUND

The present invention relates to video encoding, and more particularly, to a video encoding apparatus having a reconstruction buffer with a fixed size and/or a bandwidth limitation and an associated video encoding method.

The conventional video coding standards generally adopt a coding unit (CU) based coding technique to exploit spatial and temporal redundancy. For example, the basic approach is to divide the whole source frame into a plurality of CUs, perform intra prediction/inter prediction on each CU, transform residues of each CU, and perform quantization and entropy encoding. Besides, a reconstructed frame is generated to act as a reference frame that provides reference pixel data used for coding following CUs. For certain video coding standards, in-loop filter(s) may be used for enhancing the image quality of the reconstructed/reference frame. A video decoder is used to perform an inverse operation of a video encoding operation performed by a video encoder. For example, a reconstructed frame is generated in the video decoder to act as a reference frame that provides reference pixel data used for decoding following CUs.

In a conventional video encoding system, a reconstruction/reference buffer is used to buffer a reconstructed/reference frame that can be used for inter prediction. Typically, the reconstruction/reference buffer is implemented by allocating a buffer in a dynamic random access memory (DRAM). Hence, a size of the reconstruction/reference buffer is allowed to vary according to a resolution of an input source frame. The variable-size buffer is capable of fully storing information of the reconstructed/reference frame. As a result, the conventional video encoding system design requires high DRAM bandwidth, and has high power consumption.

SUMMARY

One of the objectives of the claimed invention is to provide a video encoding apparatus having a reconstruction buffer with a fixed size and/or a bandwidth limitation and an associated video encoding method.

According to a first aspect of the present invention, an exemplary video encoding apparatus is disclosed. The exemplary video encoding apparatus includes a data buffer and a video encoding circuit. The video encoding circuit is arranged to encode a plurality of frames into a bitstream, wherein each frame comprises a plurality of coding units, each coding unit comprises a plurality of pixels, and the frames comprise a first frame and a second frame. Encoding of the first frame comprises: deriving a plurality of reference pixels of a reference frame from a plurality of reconstructed pixels of the first frame, respectively; and storing reference pixel data into the data buffer for inter prediction, wherein the reference pixel data comprise information of pixel values of the reference pixels. Encoding of the second frame comprises: performing prediction upon a coding unit in the second frame to determine a target predictor for the coding unit. The prediction performed upon the coding unit comprises: obtaining a checking result by checking if a search range on the reference frame for finding a predictor of the coding unit under an inter prediction mode includes at least one reference pixel of the reference frame that is not accessible to the video encoding circuit; and determining the target predictor for the coding unit according to the checking result.

According to a second aspect of the present invention, an exemplary video encoding method for encoding a plurality of frames into a bitstream is disclosed, wherein each frame comprising a plurality of coding units, and each coding unit comprising a plurality of pixels. The video encoding method comprises: encoding a first frame included in the frames, and encoding a second frame included in the frames. Encoding the first frame comprises: deriving a plurality of reference pixels of a reference frame from a plurality of reconstructed pixels of the first frame, respectively; and storing reference pixel data into a data buffer for inter prediction, wherein the reference pixel data comprise information of pixel values of the reference pixels. Encoding the second frame comprises: performing prediction upon a coding unit in the second frame to determine a target predictor for the coding unit, wherein the prediction performed upon the coding unit comprises: generating, by a video encoding circuit, a checking result by checking if a search range on the reference frame for finding a predictor of the coding unit under an inter prediction mode includes at least one reference pixel of the reference frame that is not accessible to the video encoding circuit; and determining the target predictor for the coding unit according to the checking result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
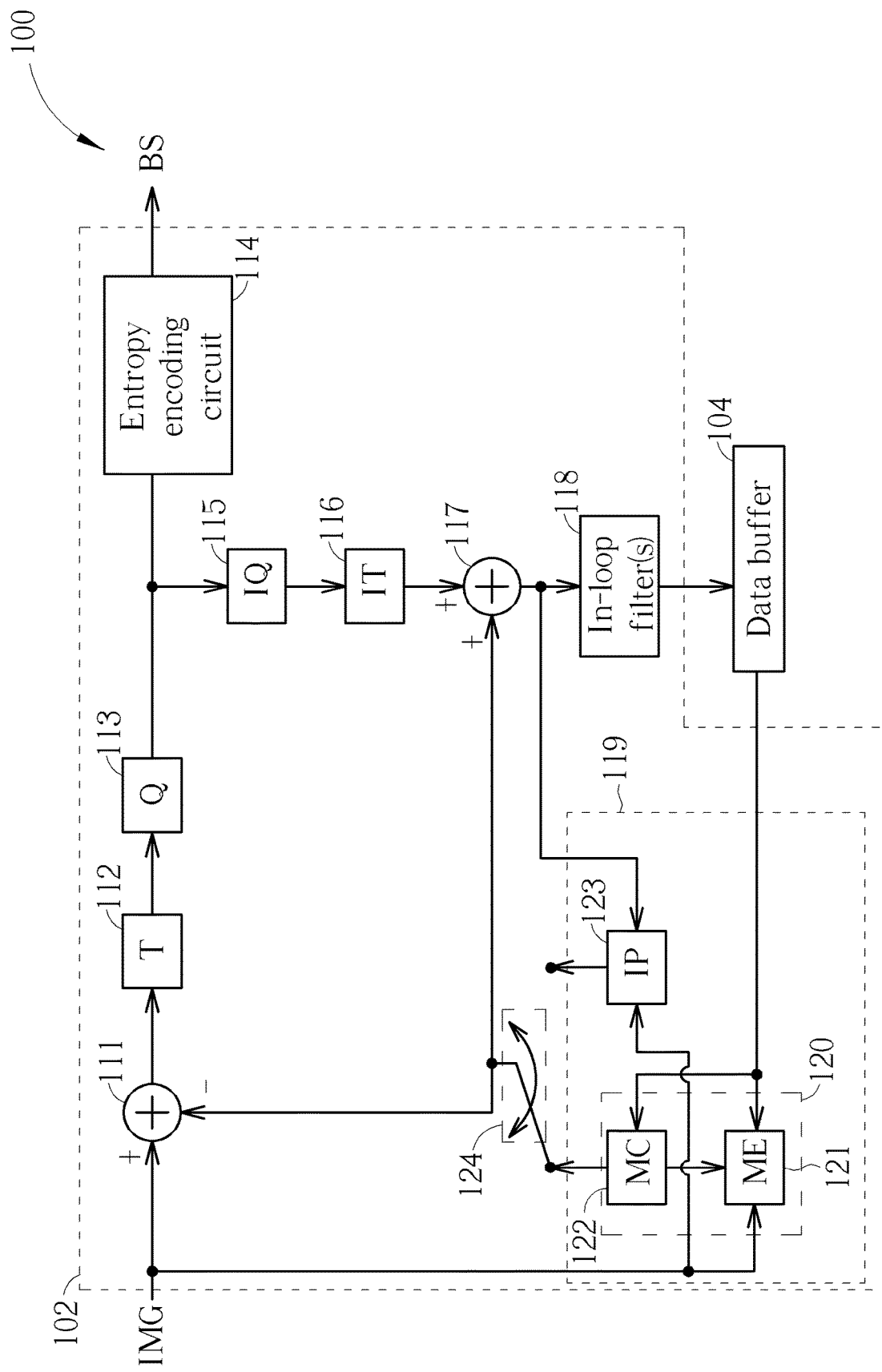
FIG. 1 is a diagram illustrating a first video encoding apparatus according to an embodiment of the present invention.

FIG. 1 is a diagram illustrating a first video encoding apparatus according to an embodiment of the present invention. The video encoding apparatus 100 includes a video encoding circuit 102 and a data buffer 104. Regarding the encoding circuit 102, it includes an adder 111 (which is used to perform data subtraction), a transform circuit (denoted by "T") 112, a quantization circuit (denoted by "Q") 113, an entropy encoding circuit (e.g., a variable length encoder) 114, an inverse quantization circuit (denoted by "IQ") 115, an inverse transform circuit (denoted by "IT") 116, an adder (which is used to perform data summation) 117, at least one in-loop filter (e.g., a deblocking filter) 118, a prediction circuit 119, and an intra/inter mode selection switch 124. The prediction circuit 119 supports an inter prediction mode and an intra prediction mode, and includes an inter prediction circuit 120 (which includes a motion estimation circuit (denoted by "ME") 121 and a motion compensation circuit (denoted by "MC") 122) and an intra prediction circuit (denoted by "IP") 123. It should be noted that the architecture of the video encoding circuit 102 shown in FIG. 1 is for illustrative purposes only, and is not meant to be a limitation of the present invention.

The adder 111 is a residual calculation circuit for subtracting a predicted block from a coding unit of an input source frame IMG to generate residual of the coding unit to the transform circuit 112. The predicted block may be generated from the intra prediction circuit 123 when the intra/inter mode selection switch 124 is controlled by an intra prediction mode that is the best coding mode selected for the coding unit, and may be generated from the inter prediction circuit 120 when the intra/inter mode selection switch 124 is controlled by an inter prediction mode that is the best coding mode selected for the coding unit. After being sequentially processed by the transform circuit 112 and the quantization circuit 113, the residual of the coding unit is converted into quantized transform coefficients, where the quantized transform coefficients are entropy encoded at the entropy encoding circuit 114 to be a part of the bitstream BS.

The video encoding circuit 102 has an internal decoding circuit. Hence, the quantized transform coefficients are sequentially processed via the inverse quantization circuit 115 and the inverse transform circuit 116 to generate decoded residual of the coding unit to the adder 117. The adder 117 acts as a reconstruction circuit that combines the decoded residual of the coding unit and the predicted block of the coding unit to generate a reconstructed coding unit in a reconstructed frame. Before the reconstructed frame is stored into the data buffer 104, the in-loop filter(s) 118 may perform designated in-loop filtering upon the reconstructed frame. For example, the in-loop filter(s) 118 may include a deblocking filter intended to reduce the blocking artifacts introduced due to CU-based coding.

In this example, reference pixels of a reference frame are derived from reconstructed pixels of the input source frame IMG, and reference pixel data are stored into the data buffer 104 that acts as a reconstruction/reference buffer, where the reference pixel data include information of pixel values of the reference pixels. The video encoding circuit 102 (particularly, inter prediction circuit 120) may retrieve a portion of the reference pixel data stored in the data buffer 104 to find a predictor of a coding unit under an inter prediction mode.

Figure 2:
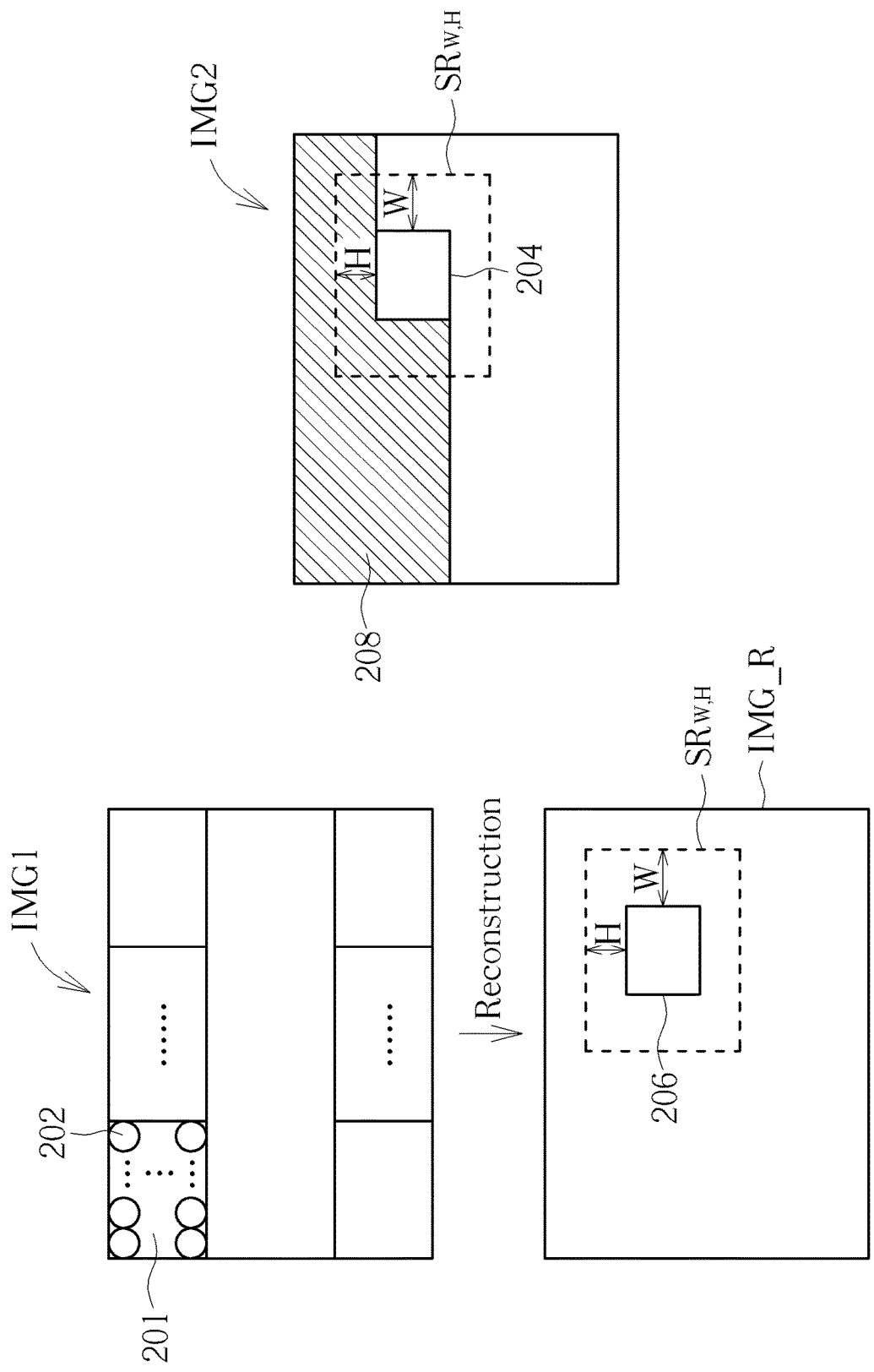
FIG. 2 is a diagram illustrating a prediction operation performed by the prediction circuit 119 for finding a predictor of a coding unit.

FIG. 2 is a diagram illustrating a prediction operation performed by the prediction circuit 119 for finding a predictor of a coding unit. The video encoding circuit 102 is arranged to encode a plurality of input source frames IMG into the bitstream BS, where each frame includes a plurality of coding units, and each coding unit includes a plurality of pixels. As shown in FIG. 2, the input source frames IMG include a first frame IMG1 and a second frame IMG2. Taking the first frame IMG1 for example, it is divided into a plurality of coding units 201, each having a plurality of pixels 202. The first frame IMG1 and the second frame IMG2 are consecutive frames fed into the video encoding circuit 102. Hence, the start time of encoding the first frame IMG1 is earlier than the start time of encoding the second frame IMG2. The video encoding circuit 102 encodes the first frame IMG1 into the bitstream BS, and further generates a reconstructed frame at the reconstruction circuit (i.e., adder 117). A reference frame IMG_R may be derived from passing the reconstructed frame (which is generated from the encoded data of the first frame IMG1) through the in-loop filter 118. A current coding unit 204 of the second frame IMG2 is encoded with one of prediction methods supported by the prediction circuit 119. In a case where the best coding mode selected for the current coding unit 204 is an intra prediction mode, a Palette mode, or an intra block copy mode, a predictor for the current coding unit 204 may be derived from previous reconstructed pixels 208 in the same frame (i.e., second frame IMG2). In another case where the best coding mode selected for the current coding unit 204 is an inter prediction mode, a predictor for the current coding unit 204 may be derived from reference pixels in other frame(s) (e.g., reference frame IMG_R). A search range $SR_{W,H}$ of the current coding unit 204 is defined by two parameters W and H. More specifically, the search range $SR_{W,H}$ is defined by ($\pm W$, $\pm H$). A co-located block 206 can be found in the reference fame IMG_R. The search range $SR_{W,H}$ assigned to the current coding unit 204 is applied to the reference frame IMG_R and is centered at the co-located block 206. Hence, the search range $SR_{W,H}$ in the reference fame IMG_R defines the boundary for motion vectors and limits the number of reference blocks to evaluate. In other words, only reference pixels of the reference frame IMG_R that are located within the search range search range $SR_{W,H}$ can be referenced by motion estimation for finding the predictor (i.e., motion vector) of the current coding unit 204.

To reduce the DRAM bandwidth and/or power consumption, a reconstruction/reference buffer (e.g., data buffer 104) may be implemented with a static random access memory (SRAM). However, it is possible that a memory bandwidth (BW) limitation is still applied to the data buffer 104. According to the memory BW limitation, one or more reference pixels stored in the data buffer 104 may be blocked from being read from the data buffer 104 and transmitted to the video encoding circuit 102 (particularly, motion estimation circuit 121 of prediction circuit 119). In other words, reference pixels stored in the data buffer 104 include valid reference pixels that are accessible to the video encoding circuit 102 and invalid reference pixels that are not accessible to the video encoding circuit 102. In this embodiment, the video encoding circuit 102 (particularly, prediction circuit 119) performs prediction upon the current coding unit 204 in the second frame IMG2 shown in FIG. 2 to determine a target predictor for the current coding unit 204. Since one or more reference pixels stored in the data buffer 104 may be invalid reference pixels, the video encoding circuit 102 (particularly, prediction circuit 119) generates a checking result by checking if the search range $SR_{W,H}$ on the reference frame IMG_R for finding a predictor of the current coding unit 204 under an inter prediction mode includes at least one reference pixel of the reference frame IMG_R that is not accessible to the video encoding circuit 102, and determines the target predictor for the current coding unit 204 according to the checking result.

A reconstruction/reference buffer (e.g., data buffer 104) may be implemented with an SRAM. Hence, the size of the data buffer 104 is fixed, regardless of the resolution of the input source frame. However, it is possible that the size of the reference frame (which is derived from the reconstructed frame) may be larger than that of the fixed-size reconstruction/reference buffer. To address this issue, the present invention proposes discarding a portion of reference pixels included in the reference frame (which is derived from the reconstructed frame), such that not all of the reference pixels in the reference frame are stored into the fixed-size reconstruction/reference buffer.

Figure 3:
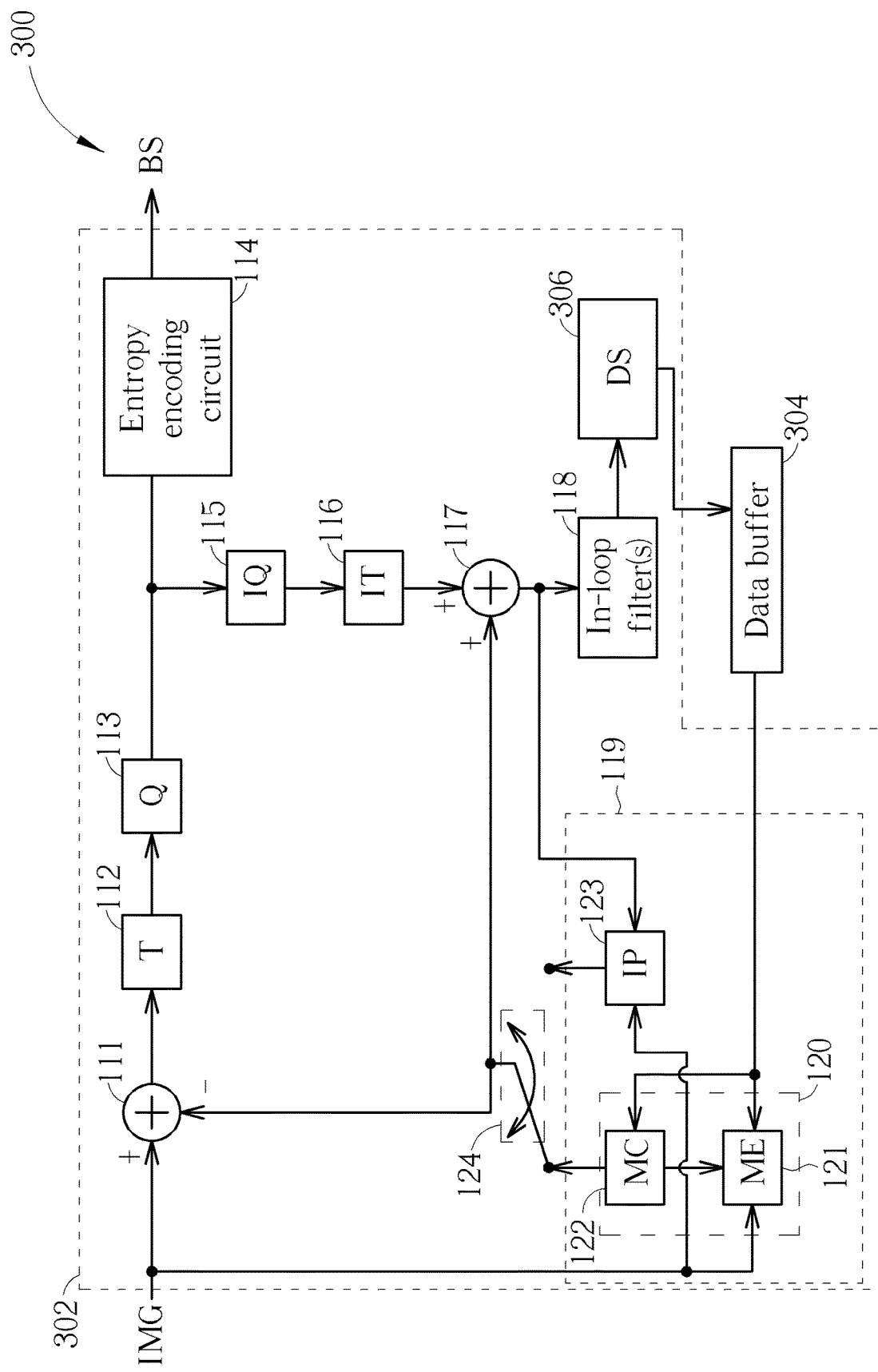
FIG. 3 is a diagram illustrating a second video encoding apparatus according to an embodiment of the present invention.

FIG. 3 is a diagram illustrating a second video encoding apparatus according to an embodiment of the present invention. The major difference between the video encoding apparatuses 300 and 100 is that a video encoding circuit 302 of the video encoding apparatus 300 includes a discarding circuit (denoted by "DS") 306 that is coupled between a data buffer 304 and the in-loop filter 118. It should be noted that the architecture of the video encoding circuit 302 shown in FIG. 3 is for illustrative purposes only, and is not meant to be a limitation of the present invention. In this embodiment, reference pixels of a reference frame are derived from reconstructed pixels of the input source frame IMG, and reference pixel data are stored into the data buffer 304 that acts as a reconstruction/reference buffer, where the reference pixel data include information of pixel values of the reference pixels. The video encoding circuit 302 (particularly, inter prediction circuit 120) may retrieve a portion of the reference pixel data stored in the data buffer 304 to find a predictor of a coding unit under an inter prediction mode.

In this embodiment, one or more reference pixels of the reference frame (which is derived from the reconstructed frame) are discarded by the discarding circuit 306 without being stored into the data buffer 304 that has a fixed size smaller than the size of the reference frame. In other words, reference pixels of the reference frame that are stored in the data buffer 304 are only a part of the reference frame. Hence, the reference frame includes valid reference pixels that are stored in the data buffer 304 and are accessible to the video encoding circuit 302, and further includes invalid reference pixels that are not accessible to the video encoding circuit 302 due to being discarded by the discarding circuit 306. In this embodiment, the video encoding circuit 302 (particularly, prediction circuit 119) performs prediction upon the current coding unit 204 in the second frame IMG2 shown in FIG. 2 to determine a target predictor for the current coding unit 204. Since one or more reference pixels that are not stored in the data buffer 304 are invalid reference pixels, the video encoding circuit 302 (particularly, prediction circuit 119) generates a checking result by checking if the search range $SR_{W,H}$ on the reference frame IMG_R for finding a predictor of the current coding unit 204 under an inter prediction mode includes at least one reference pixel of the reference frame IMG_R that is not accessible to the video encoding circuit 302, and determines the target predictor for the current coding unit 204 according to the checking result.

Figure 4:
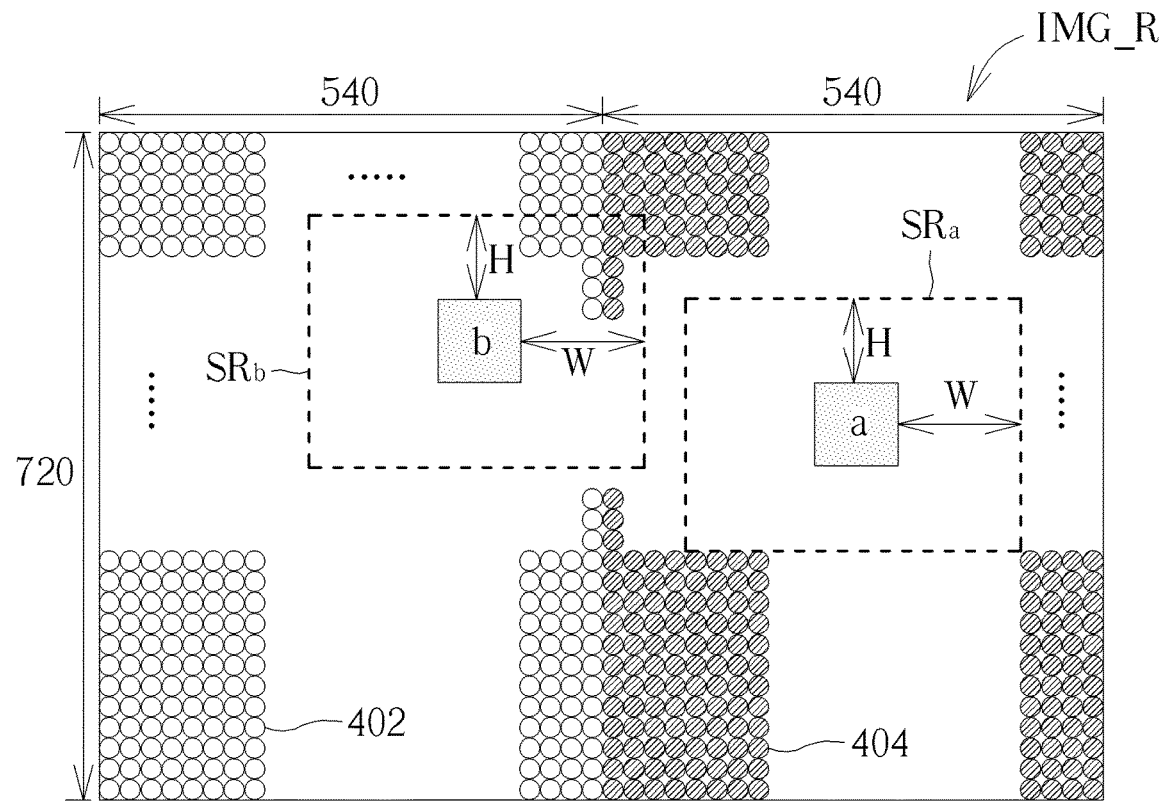
FIG. 4 is a diagram illustrating a first example of performing prediction upon coding units to determine target predictors for the coding units according to an embodiment of the present invention.

FIG. 4 is a diagram illustrating a first example of performing prediction upon coding units to determine target predictors for the coding units according to an embodiment of the present invention. In this example, the reference frame IMG_R has a resolution of 1280×720. Reference pixels included in a left half of the reference frame IMG_R (i.e., one partial reference frame with a resolution of 540×720) are valid reference pixels 402, while reference pixels included in a right half of the reference frame IMG_R (i.e., another partial reference frame with a resolution of 540×720) are invalid reference pixels 404. In a case where the reference frame IMG_R is generated by the video encoding circuit 102 shown in FIG. 1, the invalid reference pixels 404 are reference pixels that are stored in the data buffer 104 but are blocked from being transmitted to the video encoding circuit 102 due to a memory BW limitation. In another case where the reference frame IMG_R is generated by the video encoding circuit 302 shown in FIG. 3, the invalid reference pixels 404 are reference pixels that are not stored in the data buffer 304 due to being discarded by the discarding circuit 306.

As shown in FIG. 4, all reference pixels within a search range $SR_a$ of a coding unit labeled by 'a' are invalid reference pixels 404. In accordance with a checking result, the video encoding circuit 102/302 forces the target predictor of the coding unit 'a' to be derived from previous reconstructed pixels in a current frame being encoded. Supposing that the coding unit 'a' is the current coding unit 204 shown in FIG. 2, the video encoding circuit 102/302 forces the target predictor of the coding unit 'a' to be derived from previous reconstructed pixels 208. For example, the coding mode of the coding unit 'a' is forced to be an intra prediction mode, a Palette mode, or an intra block copy mode.

Figure 5:
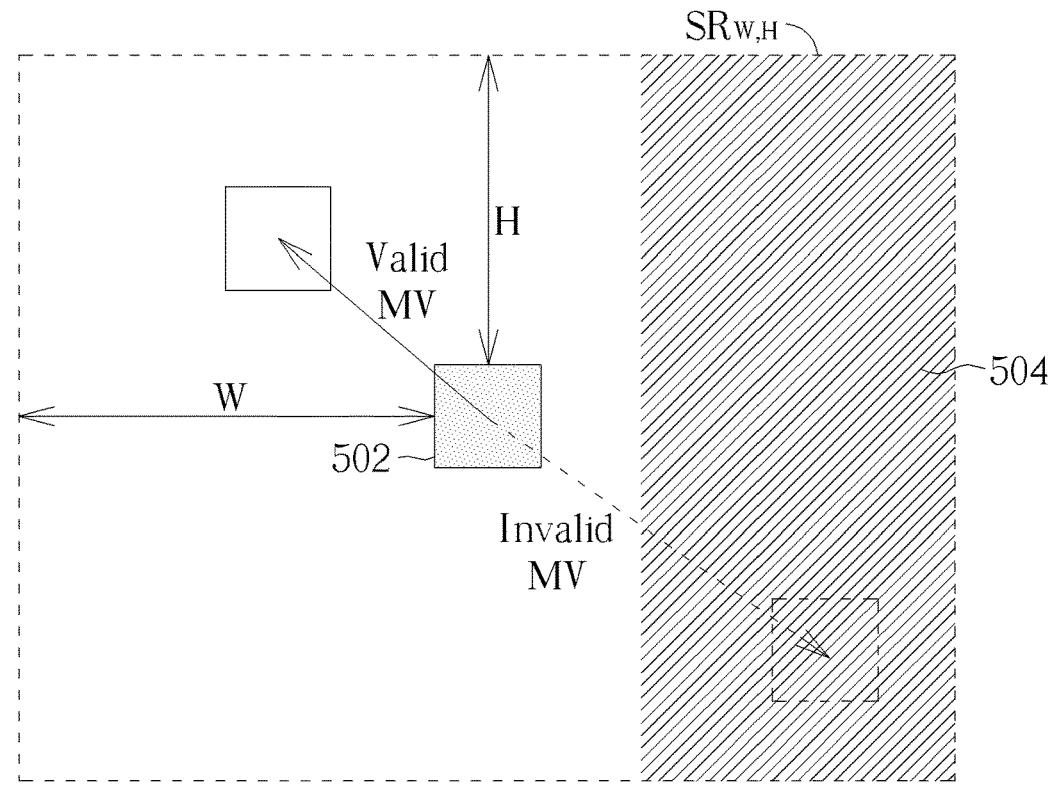
FIG. 5 is a diagram illustrating an example of restricting a motion vector search for a coding unit with a search range on a reference frame shown in FIG. 4.

As shown in FIG. 4, reference pixels within a search range $SR_b$ of a coding unit labeled by 'b' include valid reference pixels 402 and invalid reference pixels 404. In accordance with a checking result, the video encoding circuit 102/302 finds a predictor of the coding unit 'b' under an inter prediction mode by restricting a motion vector (MV) search to valid reference pixels 402 only. FIG. 5 is a diagram illustrating an example of restricting an MV search for a coding unit with a search range on the reference frame IMG_R shown in FIG. 4. As shown in FIG. 5, a coding unit 502 to be encoded has a search range $SR_{W, H}$ on the reference frame IMG_R shown in FIG. 4. For example, the coding unit 502 may be the coding unit 'b' shown in FIG. 4, and the search range $SR_{W, H}$ may be the search range $SR_b$ shown in FIG. 4. There are invalid reference pixels 504 within the search range $SR_{W, H}$. Thus, a motion vector is invalid if the derivation of the corresponding predictor includes any invalid reference pixels 504. Conversely, a motion vector is valid if all of the pixels used for deriving the corresponding predictor are valid reference pixels.

Figure 6:
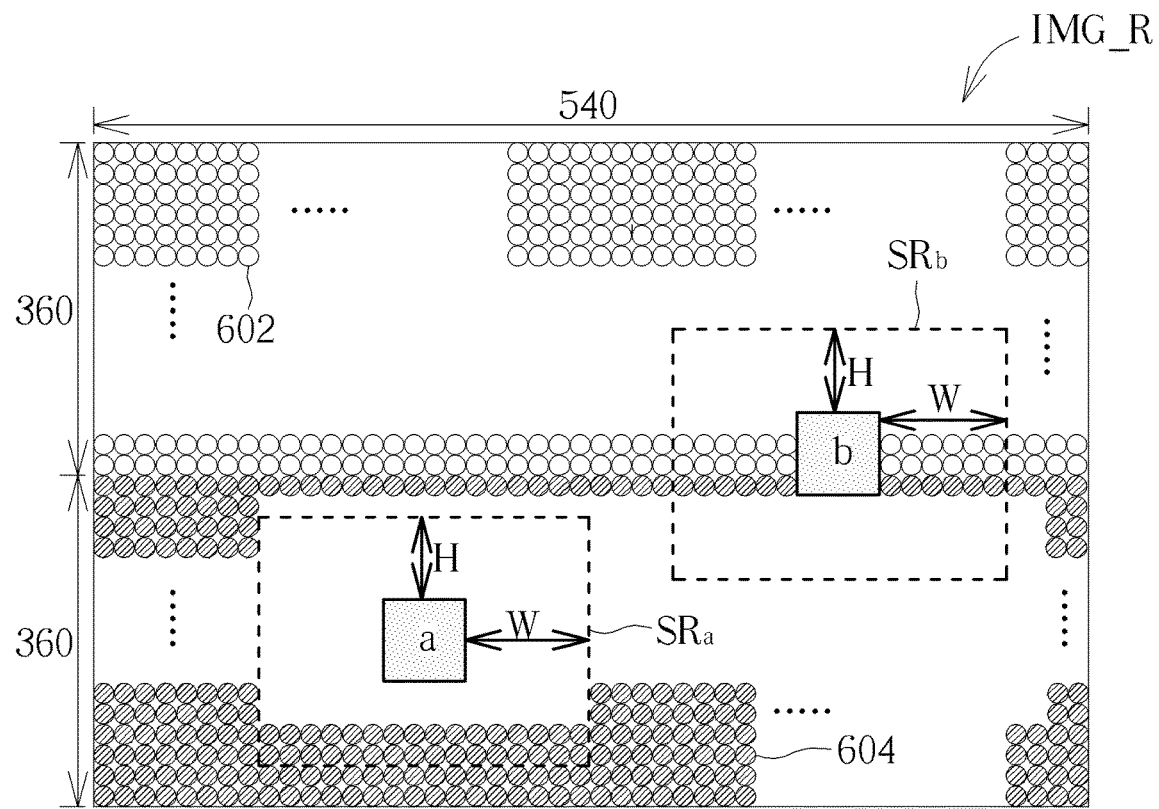
FIG. 6 is a diagram illustrating a second example of performing prediction upon coding units to determine target predictors for the coding units according to an embodiment of the present invention.

FIG. 6 is a diagram illustrating a second example of performing prediction upon coding units to determine target predictors for the coding units according to an embodiment of the present invention. In this example, the reference frame IMG_R has a resolution of 1280×720. Reference pixels included in a top half of the reference frame IMG_R (i.e., one partial reference frame with a resolution of 1280×360) are valid reference pixels 602, while reference pixels included in a bottom half of the reference frame IMG_R (i.e., another partial reference frame with a resolution of 1280×360) are invalid reference pixels 604. In a case where the reference frame IMG_R is generated by the video encoding circuit 102 shown in FIG. 1, the invalid reference pixels 604 are reference pixels that are stored in the data buffer 104 but are blocked from being transmitted to the video encoding circuit 102 due to a memory BW limitation. In another case where the reference frame IMG_R is generated by the video encoding circuit 302 shown in FIG. 3, the invalid reference pixels 604 are reference pixels that are not stored in the data buffer 304 due to being discarded by the discarding circuit 306.

As shown in FIG. 6, all reference pixels within a search range $SR_a$ of a coding unit labeled by 'a' are invalid reference pixels 604. In accordance with a checking result, the video encoding circuit 102/302 forces the target predictor of the coding unit 'a' to be derived from previous reconstructed pixels in a current frame being encoded. Supposing that the coding unit 'a' is the current coding unit 204 shown in FIG. 2, the video encoding circuit 102/302 forces the target predictor of the coding unit 'a' to be derived from previous reconstructed pixels 208. For example, the coding mode of the coding unit 'a' is forced to be an intra prediction mode, a Palette mode, or an intra block copy mode.

Figure 7:
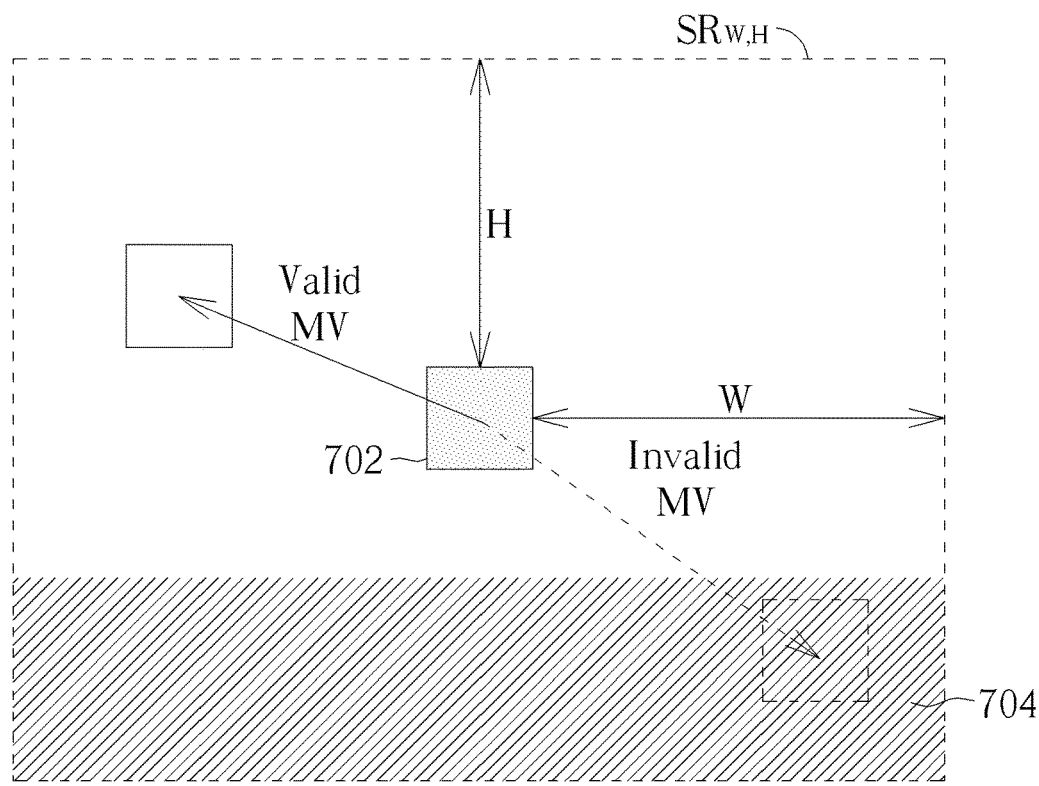
FIG. 7 is a diagram illustrating an example of restricting a motion vector search for a coding unit with a search range on a reference frame shown in FIG. 6.

As shown in FIG. 6, reference pixels within a search range $SR_b$ of a coding unit labeled by 'b' include valid reference pixels 602 and invalid reference pixels 604. In accordance with a checking result, the video encoding circuit 102/302 finds a predictor of the coding unit 'b' under an inter prediction mode by restricting an MV search to valid reference pixels 602 only. FIG. 7 is a diagram illustrating an example of restricting an MV search for a coding unit with a search range on the reference frame IMG_R shown in FIG. 6. As shown in FIG. 7, a coding unit 702 to be encoded has a search range $SR_{W, H}$ on the reference frame IMG_R shown in FIG. 6. For example, the coding unit 702 may be the coding unit 'b' shown in FIG. 6, and the search range $SR_{W, H}$ may be the search range $SR_b$ shown in FIG. 6. There are invalid reference pixels 704 within the search range $SR_{W, H}$. Thus, a motion vector is invalid if the derivation of the corresponding predictor includes any invalid reference pixels 704. Conversely, a motion vector is valid if all of the pixels used for deriving the corresponding predictor are valid reference pixels.

Figure 8:
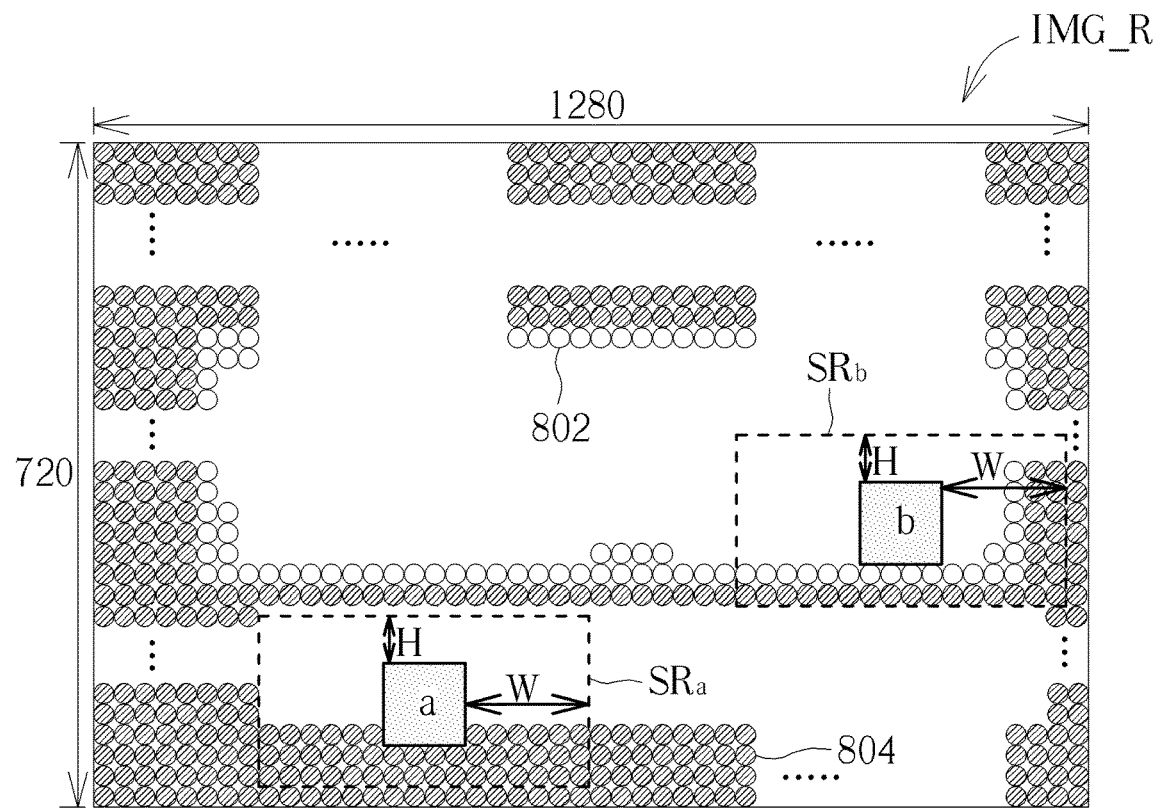
FIG. 8 is a diagram illustrating a third example of performing prediction upon coding units to determine target predictors for the coding units according to an embodiment of the present invention.

FIG. 8 is a diagram illustrating a third example of performing prediction upon coding units to determine target predictors for the coding units according to an embodiment of the present invention. In this example, the reference frame IMG_R has a resolution of 1280×720. Reference pixels near the center of the reference frame IMG_R (i.e., one partial reference frame with a rectangle shape) are valid reference pixels 802, while reference pixels near four sides of the reference frame IMG_R (i.e., another partial reference frame with a ring shape) are invalid reference pixels 804. In a case where the reference frame IMG_R is generated by the video encoding circuit 102 shown in FIG. 1, the invalid reference pixels 804 are reference pixels that are stored in the data buffer 104 but are blocked from being transmitted to the video encoding circuit 102 due to a memory BW limitation. In another case where the reference frame IMG_R is generated by the video encoding circuit 302 shown in FIG. 3, the invalid reference pixels 804 are reference pixels that are not stored in the data buffer 304 due to being discarded by the discarding circuit 306.

As shown in FIG. 8, all reference pixels within a search range $SR_a$ of a coding unit labeled by 'a' are invalid reference pixels 804. In accordance with a checking result, the video encoding circuit 102/302 forces the target predictor of the coding unit 'a' to be derived from previous reconstructed pixels in a current frame being encoded. Supposing that the coding unit 'a' is the current coding unit 204 shown in FIG. 2, the video encoding circuit 102/302 forces the target predictor of the coding unit 'a' to be derived from previous reconstructed pixels 208. For example, the coding mode of the coding unit 'a' is forced to be an intra prediction mode, a Palette mode, or an intra block copy mode.

Figure 9:
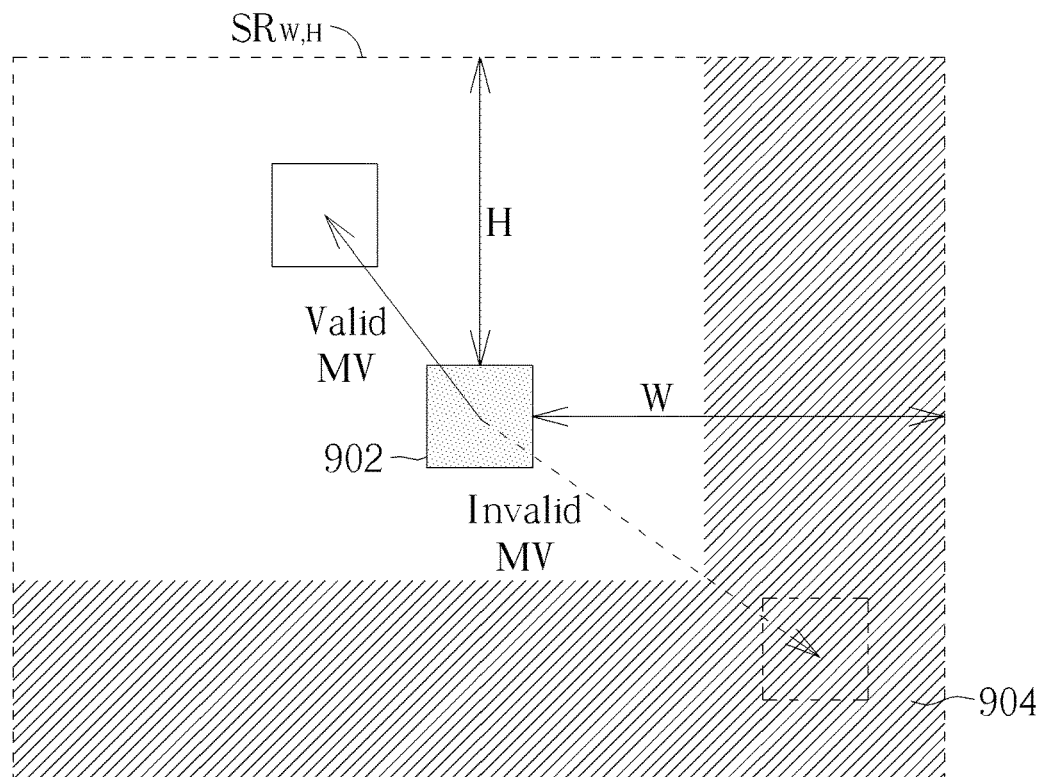
FIG. 9 is a diagram illustrating an example of restricting a motion vector search for a coding unit with a search range on a reference frame shown in FIG. 8.

As shown in FIG. 8, reference pixels within a search range $SR_b$ of a coding unit labeled by 'b' include valid reference pixels 802 and invalid reference pixels 804. In accordance with a checking result, the video encoding circuit 102/302 finds a predictor of the coding unit 'b' under an inter prediction mode by restricting an MV search to valid reference pixels 802 only. FIG. 9 is a diagram illustrating an example of restricting an MV search for a coding unit with a search range on the reference frame IMG_R shown in FIG. 8. As shown in FIG. 9, a coding unit 902 to be encoded has a search range $SR_{W,H}$ on the reference frame IMG_R shown in FIG. 8. For example, the coding unit 902 may be the coding unit 'b' shown in FIG. 8, and the search range $SR_{W,H}$ may be the search range $SR_b$ shown in FIG. 8. There are invalid reference pixels 904 within the search range $SR_{W,H}$. Thus, a motion vector is invalid if the derivation of the corresponding predictor includes any invalid reference pixels 904. Conversely, a motion vector is valid if all of the pixels used for deriving the corresponding predictor are valid reference pixels.

As mentioned above, the data buffer 304 (which acts as a reconstruction/reference buffer) may be implemented with an SRAM. Hence, the size of the data buffer 304 is fixed, regardless of the resolution of the input source frame. To reserve more reference pixels accessible to the video encoding circuit under a condition that the size of the reference frame (which is derived from the reconstructed frame) is larger than the size of the data buffer 304, the present invention proposes applying data compression to reference pixels included in the reference frame.

Figure 10:
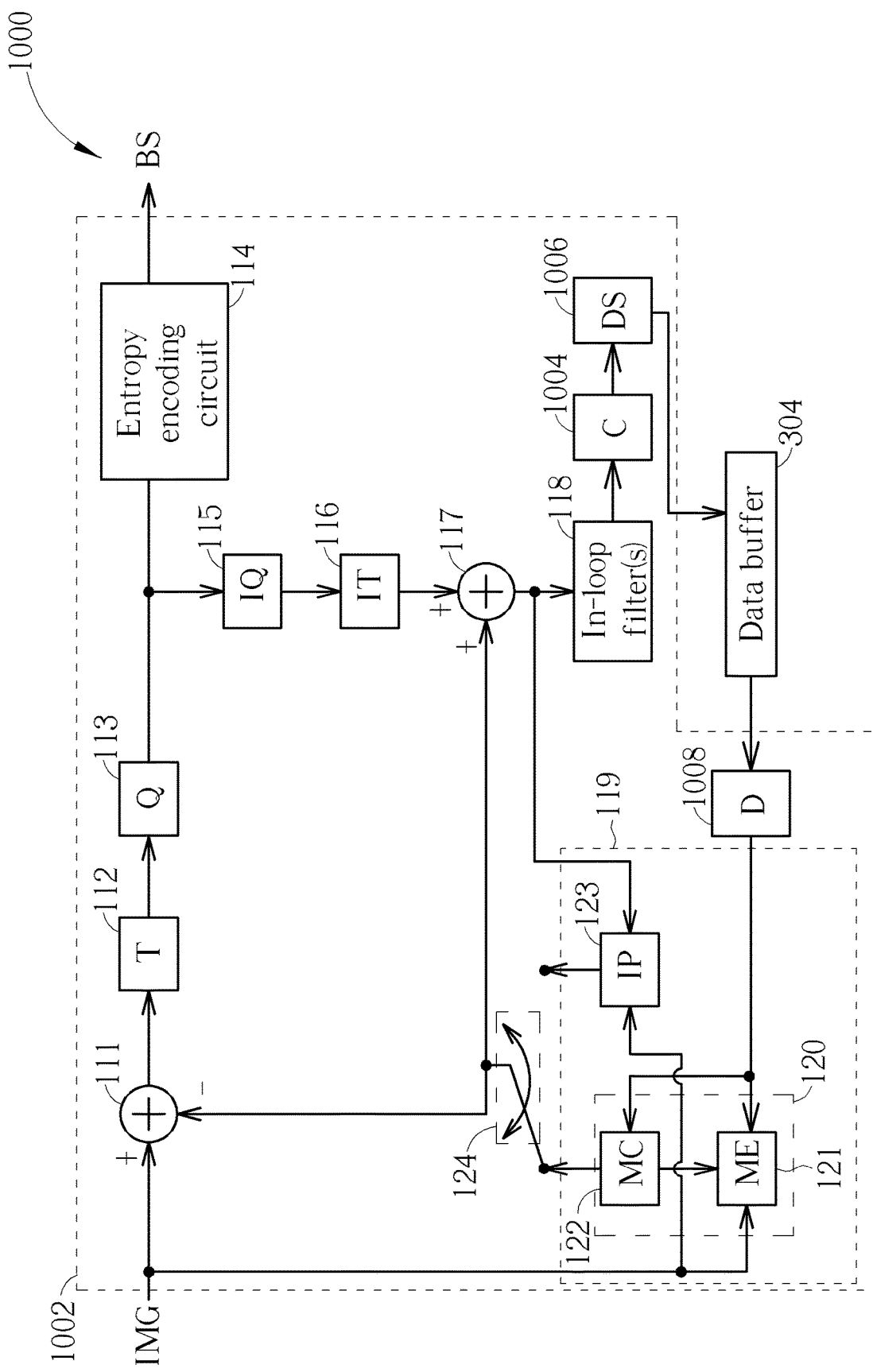
FIG. 10 is a diagram illustrating a third video encoding apparatus according to an embodiment of the present invention.

FIG. 10 is a diagram illustrating a third video encoding apparatus according to an embodiment of the present invention. The major difference between the video encoding apparatuses 1000 and 300 is that a video encoding circuit 1002 of the video encoding apparatus 1000 includes a compression circuit (denoted by "C") 1004, a discarding circuit (denoted by "DS") 1006, and a decompression circuit (denoted by "D") 1008. It should be noted that the architecture of the video encoding circuit 1002 shown in FIG. 10 is for illustrative purposes only, and is not meant to be a limitation of the present invention. In this embodiment, reference pixels of a reference frame are derived from reconstructed pixels of the input source frame IMG, and reference pixel data are stored into the data buffer 304 that acts as a reconstruction/reference buffer, where the reference pixel data include information of pixel values of the reference pixels. Since the compression circuit 1004 is located between the in-loop filter 118 and the data buffer 304, the reference pixel data in the data buffer 304 are stored in a compressed format. Specifically, the compression circuit 1004 generates an encoded bitstream of the reference pixel data by applying data compression to the pixel values of the reference pixels, and the encoded bitstream of the reference pixel data is stored into the data buffer 304. For example, a lossless compression scheme is employed by the compression circuit 1004. The decompression circuit 1008 can retrieve a portion of the encoded bitstream of the reference pixel data from the data buffer 304, and can obtain a portion of the reference pixel data by applying data decompression to the portion of the encoded bitstream of the reference pixel data. Hence, the video encoding circuit 1002 (particularly, inter prediction circuit 120) may refer to the portion of the reference pixel data provided from the decompression circuit 1008 to find a predictor of a coding unit under an inter prediction mode.

However, it is possible that the size of the compressed reference frame may still be larger than that of the fixed-size reconstruction/reference buffer. In this embodiment, an encoded bitstream of one or more reference pixels of the reference frame (which is derived from the reconstructed frame) is discarded by the discarding circuit 1006 without being stored into the data buffer 304 that has a fixed size smaller than the size of the compressed reference frame. In other words, reference pixels of the reference frame that are compressed and then stored in the data buffer 304 are only a part of the reference frame. Hence, the reference frame includes valid reference pixels that are stored in the data buffer 104 after compression and are accessible to the video encoding circuit 1002 via the decompression circuit 1008, and further includes invalid reference pixels that are not accessible to the video encoding circuit 1002 due to being discarded by the discarding circuit 1006 after compression.

Figure 11:
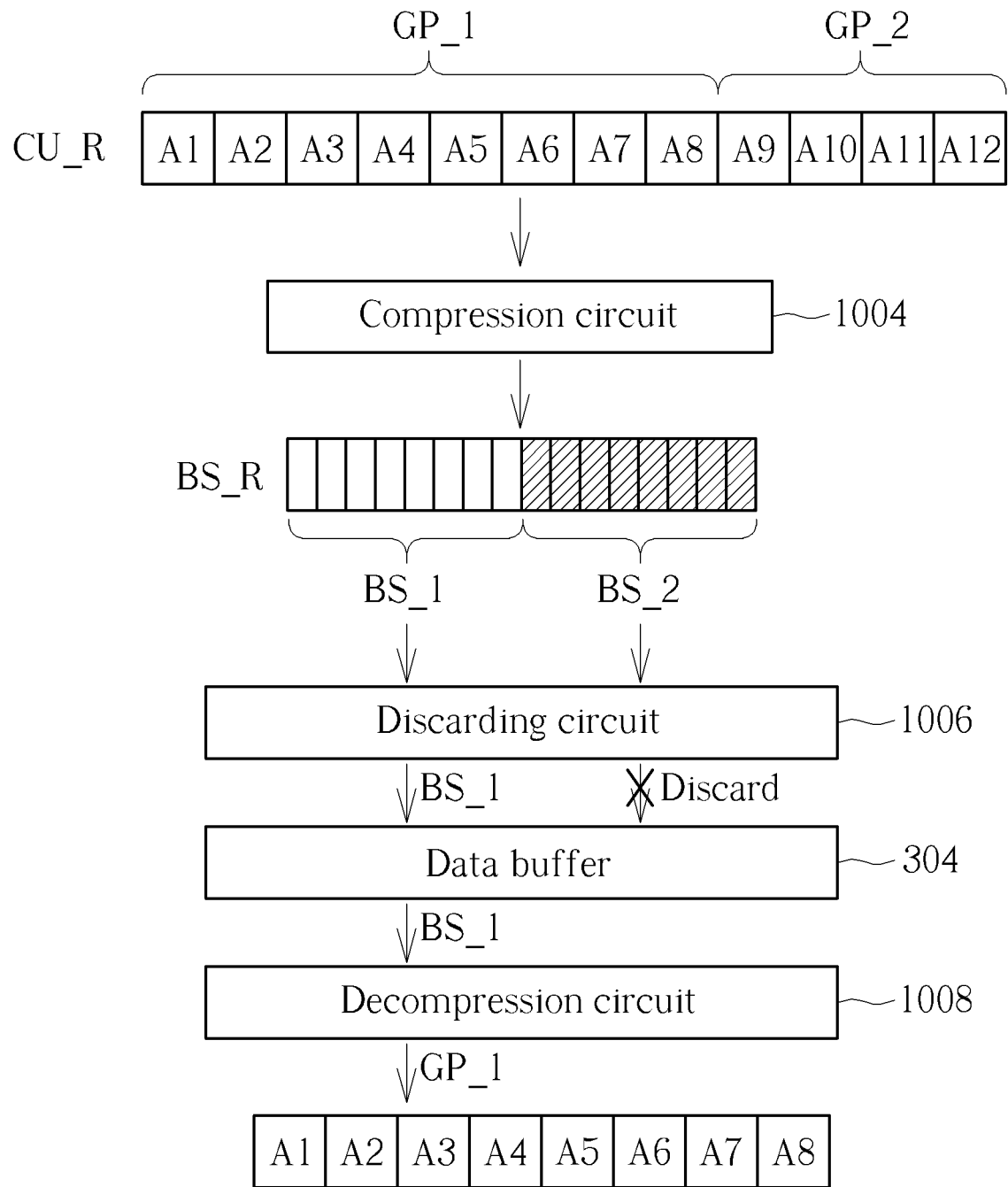
FIG. 11 is a diagram illustrating a first example of accessing a data buffer through compression/decompression according to an embodiment of the present invention.

FIG. 11 is a diagram illustrating a first example of accessing a data buffer through compression/decompression according to an embodiment of the present invention. In this example, the discarding circuit 1006 is arranged to operate on a coding unit row basis. As shown in FIG. 11, one coding unit row CU_R of a reference frame (which is derived from a reconstructed frame) includes a plurality of coding units A1-A12. The compression circuit 1004 applies data compression (e.g., lossless compression) to the coding unit row CU_R to generate an encoded bitstream BS_R of the coding unit row CU_R, wherein the first half (i.e., first 50% size) of the encoded bitstream BS_R is an encoded bitstream BS_1 of a coding unit group GP_1 consisting of coding units A1-A8, and the second half (i.e., last 50% size) of the encoded bitstream BS_R is an encoded bitstream BS_2 of a coding unit group GP_2 consisting of coding units A9-A12. In this example, the discarding circuit 1006 discards the second half (i.e., last 50% size) of the encoded bitstream BS_R, such that the encoded bitstream BS_2 of the coding unit group GP_2 consisting of coding units A9-A12 is not stored into the data buffer 304. Since the encoded bitstream BS_1 is available in the data buffer 304, the decompression circuit 1008 can read the encoded bitstream BS_1 from the data buffer 304, and can recover the coding unit group GP_1 (which consists of coding units A1-A8) by applying data decompression to the encoded bitstream BS_1. Hence, reference pixels included in the coding units A1-A8 are valid reference pixels that are accessible to the video encoding circuit 1002, while reference pixels included in the coding units A9-A12 are invalid reference pixels that are not accessible to the video encoding circuit 1002 due to being discarded after compression.

In this embodiment, the video encoding circuit 1002 (particularly, prediction circuit 119) performs prediction upon the current coding unit 204 in the second frame IMG2 shown in FIG. 2 to determine a target predictor for the current coding unit 204. Since one or more reference pixels that are not stored in the data buffer 304 after compression are invalid reference pixels, the video encoding circuit 1002

(particularly, prediction circuit 119) generates a checking result by checking if the search range $SR_{W,\,H}$ on the reference frame IMG_R for finding a predictor of the current coding unit 204 under an inter prediction mode includes at least one reference pixel of the reference frame IMG_R that is not accessible to the video encoding circuit 1002, and determines the target predictor for the current coding unit 204 according to the checking result.

Figure 12:
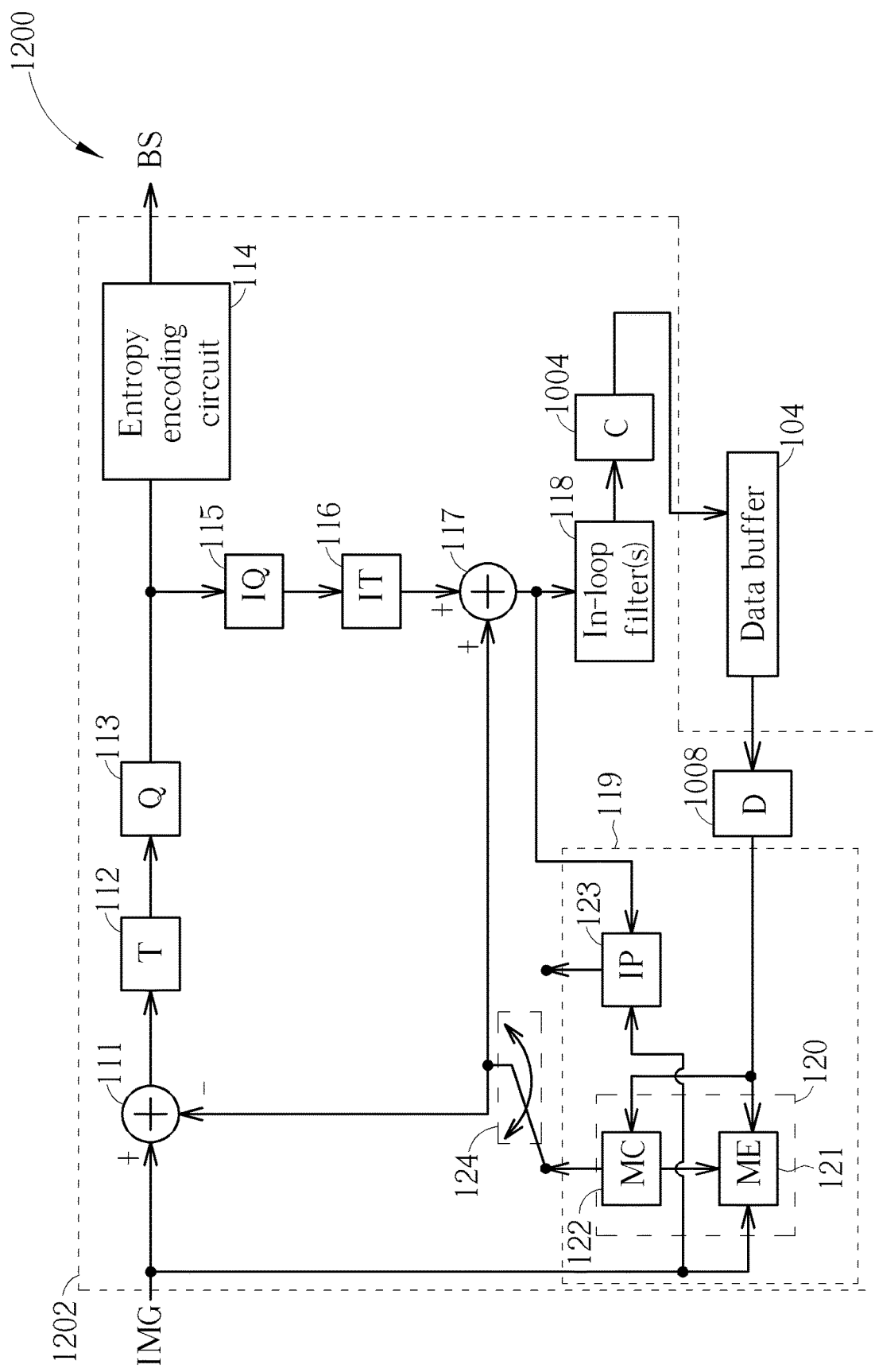
FIG. 12 is a diagram illustrating a fourth video encoding apparatus according to an embodiment of the present invention.

To reduce the DRAM bandwidth and/or power consumption, a reconstruction/reference buffer may be implemented with an SRAM. However, it is possible that a memory BW limitation is still applied to the reconstruction/reference buffer that is implemented by SRAM. FIG. 12 is a diagram illustrating a fourth video encoding apparatus according to an embodiment of the present invention. The major difference between the video encoding apparatuses 1200 and 100 is that a video encoding circuit 1202 of the video encoding apparatus 1200 includes a compression circuit (denoted by "C") 1004 and a decompression circuit (denoted by "D") 1008. It should be noted that the architecture of the video encoding circuit 1202 shown in FIG. 12 is for illustrative purposes only, and is not meant to be a limitation of the present invention. In this embodiment, reference pixels of a reference frame are derived from reconstructed pixels of the input source frame IMG, and reference pixel data are stored into the data buffer 104 that acts as a reconstruction/ reference buffer, where the reference pixel data include information of pixel values of the reference pixels. Since the compression circuit 1004 is located between the in-loop filter 118 and the data buffer 104, the reference pixel data in the data buffer 104 are stored in a compressed format. Specifically, the compression circuit 1004 generates an encoded bitstream of the reference pixel data by applying data compression to the pixel values of the reference pixels, and stores the encoded bitstream of the reference pixel data into the data buffer 104. For example, a lossless compression scheme is employed by the compression circuit 1004. The decompression circuit 1008 can retrieve a portion of the encoded bitstream of the reference pixel data from the data buffer 104, and can obtain a portion of the reference pixel data by applying data decompression to the portion of the encoded bitstream of the reference pixel data. Hence, the video encoding circuit 1202 (particularly, inter prediction circuit 120) may refer to the portion of the reference pixel data provided from the decompression circuit 1008 to find a predictor of a coding unit under an inter prediction mode.

In this embodiment, a memory BW limitation is still applied to the data buffer 104 that is implemented by SRAM. According to the memory BW limitation, an encoded bitstream of one or more reference pixels that is stored in the data buffer 104 may be blocked from being read from the data buffer 104 and transmitted to the video encoding circuit 102 (particularly, motion estimation circuit 121 of prediction circuit 119). In other words, not all of reference pixels of the reference frame (which is derived from the reconstructed frame) that are compressed and then stored in the data buffer 104 are accessible to the video encoding circuit 1202. Hence, the reference frame includes valid reference pixels that are stored in the data buffer 104 after compression and are accessible to the video encoding circuit 1202 via the decompression circuit 1008, and further includes invalid reference pixels that are stored in the data buffer 104 after compression but are not accessible to the video encoding circuit 1202 via the decompression circuit 1008 due to the memory BW limitation.

Figure 13:
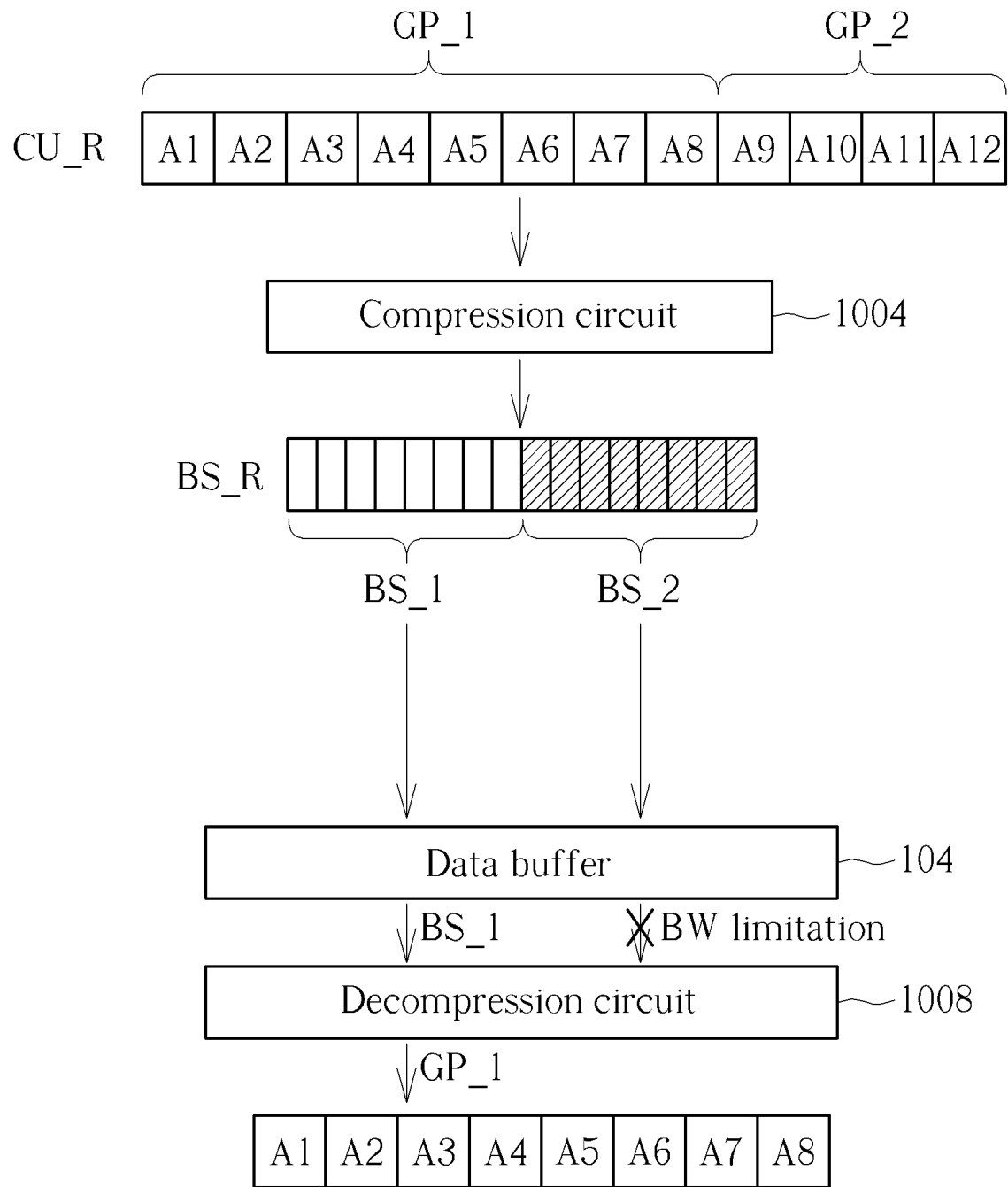
FIG. 13 is a diagram illustrating a second example of accessing a data buffer through compression/decompression according to an embodiment of the present invention.

FIG. 13 is a diagram illustrating a second example of accessing a data buffer through compression/decompression according to an embodiment of the present invention. In this embodiment, the memory BW limitation is applied on a coding unit row basis. As shown in FIG. 13, one coding unit row CU_R of a reference frame (which is derived from a reconstructed frame) includes a plurality of coding units A1-A12. The compression circuit 1004 applies data compression (e.g., lossless compression) to the coding unit row CU_R to generate an encoded bitstream BS_R of the coding unit row CU_R, wherein the first half (i.e., first 50% size) of the encoded bitstream BS_R is an encoded bitstream BS_1 of a coding unit group GP_1 consisting of coding units A1-A8, and the second half (i.e., last 50% size) of the encoded bitstream BS_R is an encoded bitstream BS_2 of a coding unit group GP_2 consisting of coding units A9-A12. In this example, the encoded bitstream BS_R is fully stored into the data buffer 104. The memory BW limitation is applied to the data buffer 104, such that the second half (i.e., last 50% size) of the encoded bitstream BS_R is blocked from being read from the data buffer 104 and transmitted to the video encoding circuit 1202. Since the encoded bitstream BS_1 is available in the data buffer 104, the decompression circuit 1008 can read the encoded bitstream BS_1 from the data buffer 104, and can recover the coding unit group GP_1 (which consists of coding units A1-A8) by applying data decompression to the encoded bitstream BS_1. Hence, reference pixels included in the coding units A1-A8 are valid reference pixels that are accessible to the video encoding circuit 1202, while reference pixels included in the coding units A9-A12 are invalid reference pixels that are not accessible to the video encoding circuit 1202 due to the memory BW limitation.

In this embodiment, the video encoding circuit 1202 (particularly, prediction circuit 119) performs prediction upon the current coding unit 204 in the second frame IMG2 shown in FIG. 2 to determine a target predictor for the current coding unit 204. Since one or more reference pixels stored in the data buffer 104 after compression may be invalid reference pixels, the video encoding circuit 1202 (particularly, prediction circuit 119) generates a checking result by checking if the search range $SR_{W,\,H}$ on the reference frame IMG_R for finding a predictor of the current coding unit 204 under an inter prediction mode includes at least one reference pixel of the reference frame IMG_R that is not accessible to the video encoding circuit 1202, and determines the target predictor for the current coding unit 204 according to the checking result.

Figure 14:
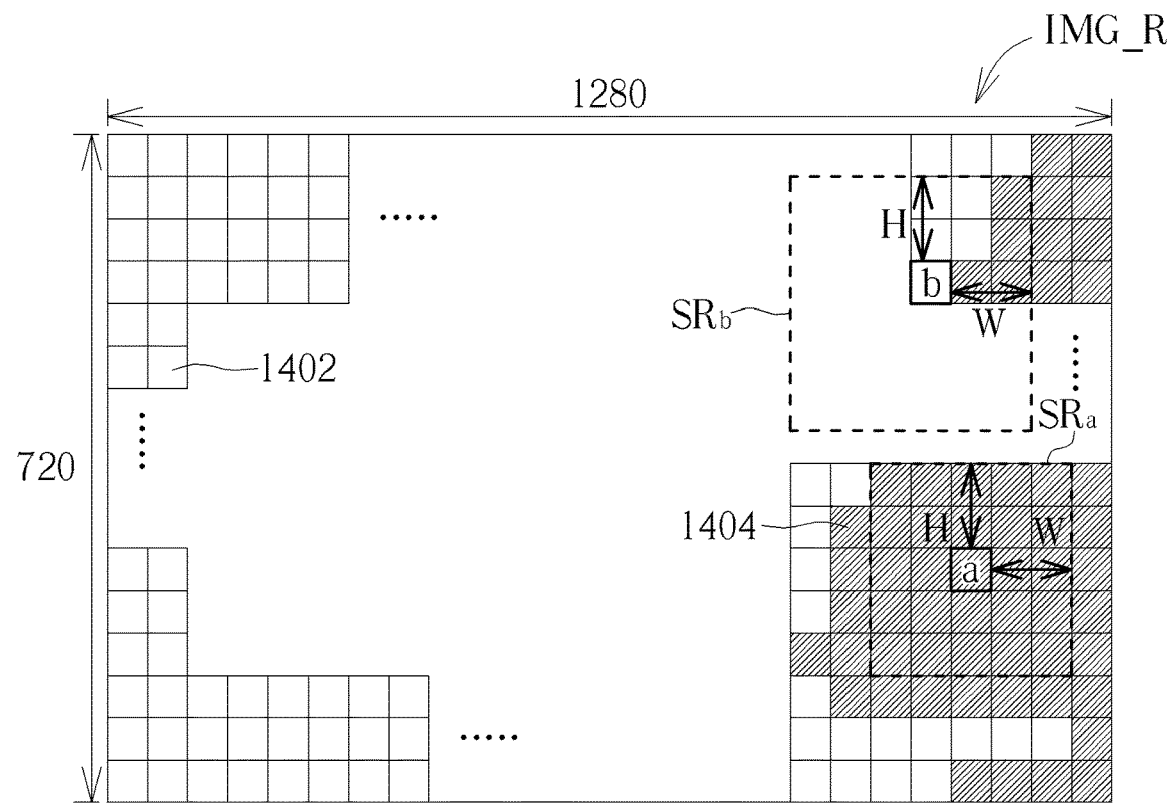
FIG. 14 is a diagram illustrating a fourth example of performing prediction upon coding units to determine target predictors for the coding units according to an embodiment of the present invention.

FIG. 14 is a diagram illustrating a fourth example of performing prediction upon coding units to determine target predictors for the coding units according to an embodiment of the present invention. In this example, the reference frame IMG_R has a resolution of 1280×720, and includes valid reference pixels 1402 and invalid reference pixels 1404. Since the discarding circuit 1006 operates on a coding unit row basis and/or the memory BW limitation is applied to the data buffer 104 on a coding unit row basis, the number of invalid reference pixels in each coding unit row is not fixed due to the fact that a losslessly compressed bitstream of each coding unit row does not have a fixed size. In a case where the reference frame IMG_R is generated by the video encoding circuit 1202 shown in FIG. 12, the invalid reference pixels are reference pixels that are stored in the data buffer 104 after compression but are blocked from being transmitted to the video encoding circuit 1202 due to the memory BW limitation. In another case where the reference frame IMG_R is generated by the video encoding circuit 1002 shown in FIG. 10, the invalid reference pixels are reference pixels that are not stored in the data buffer 304 after compression due to being discarded by the discarding circuit 1006.

As shown in FIG. 14, all reference pixels within a search range $SR_a$ of a coding unit labeled by 'a' are invalid reference pixels 1404. In accordance with a checking result, the video encoding circuit 1002/1202 forces the target predictor of the coding unit 'a' to be derived from previous reconstructed pixels in a current frame being encoded. Supposing that the coding unit 'a' is the current coding unit 204 shown in FIG. 2, the video encoding circuit 1002/1202 forces the target predictor of the coding unit 'a' to be derived from previous reconstructed pixels 208. For example, the coding mode of the coding unit 'a' is forced to be an intra prediction mode, a Palette mode, or an intra block copy mode.

Figure 15:
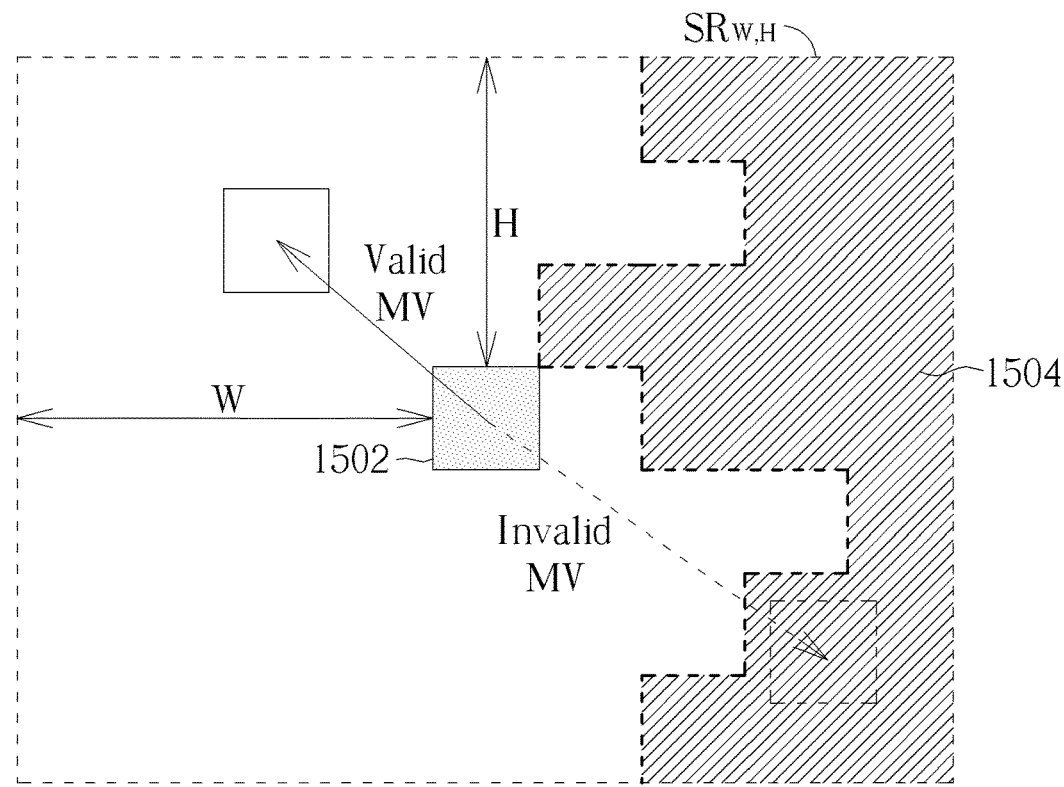
FIG. 15 is a diagram illustrating an example of restricting a motion vector search for a coding unit with a search range on a reference frame shown in FIG. 14.

As shown in FIG. 14, reference pixels within a search range $SR_b$ of a coding unit labeled by 'b' include valid reference pixels 1402 and invalid reference pixels 1404. In accordance with a checking result, the video encoding circuit 1002/1202 finds a predictor of the coding unit 'b' under an inter prediction mode by restricting an MV search to valid reference pixels 1402 only. FIG. 15 is a diagram illustrating an example of restricting an MV search for a coding unit with a search range on the reference frame IMG_R shown in FIG. 14. As shown in FIG. 15, a coding unit 1502 to be encoded has a search range $SR_{W,H}$ on the reference frame IMG_R shown in FIG. 14. There are invalid reference pixels 1504 within the search range $SR_{W,H}$. Thus, a motion vector is invalid if the derivation of the corresponding predictor includes any invalid reference pixels 1504. Conversely, a motion vector is valid if all of the pixels used for deriving the corresponding predictor are valid reference pixels.

As shown in FIG. 11, the discarding circuit 1006 operates on a coding unit row basis. As shown in FIG. 13, the memory BW limitation is applied to the data buffer 104 on a coding unit row basis. However, these are for illustrative purposes only, and are not meant to be limitations of the present invention.

In one alternative design, the discarding circuit 1006 may be arranged to operate on a frame basis, and/or the memory BW limitation may be applied to the data buffer 104 on a frame basis.

Figure 16:
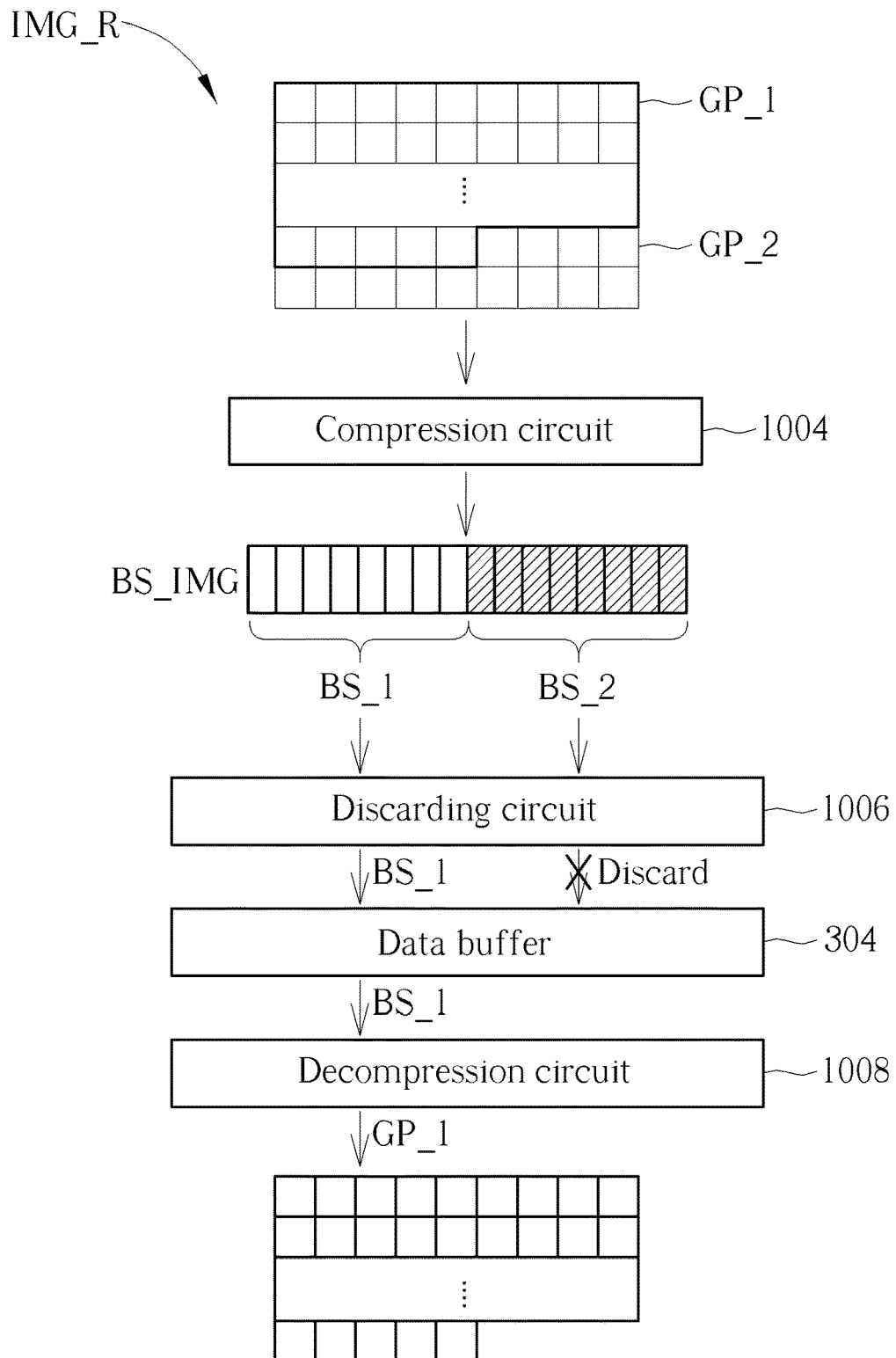
FIG. 16 is a diagram illustrating a third example of accessing a data buffer through compression/decompression according to an embodiment of the present invention.

FIG. 16 is a diagram illustrating a third example of accessing a data buffer through compression/decompression according to an embodiment of the present invention. In this example, the discarding circuit 1006 is arranged to operate on a frame basis. As shown in FIG. 16, the reference frame IMG_R is derived from a reconstructed frame, and includes a plurality of coding units. The compression circuit 1004 applies data compression (e.g., lossless compression) to the reference frame IMG_R to generate an encoded bitstream BS_IMG of the reference frame IMG_R, wherein the first half (i.e., first 50% size) of the encoded bitstream BS_IMG is an encoded bitstream BS_1 of a coding unit group GP_1 consisting of some coding units of the reference frame IMG_R, and the second half (i.e., last 50% size) of the encoded bitstream BS_IMG is an encoded bitstream BS_2 of a coding unit group GP_2 consisting of remaining coding units of the reference frame IMG_R. In this example, the discarding circuit 1006 discards the second half (i.e., last 50% size) of the encoded bitstream BS_IMG, such that the encoded bitstream BS_2 of the coding unit group GP_2 is not stored into the data buffer 304. Since the encoded bitstream BS_1 is available in the data buffer 304, the decompression circuit 1008 can read the encoded bitstream BS_1 from the data buffer 304, and can recover the coding unit group GP_1 by applying data decompression to the encoded bitstream BS_1. Hence, reference pixels included in coding units of the coding unit group GP_1 are valid reference pixels that are accessible to the video encoding circuit 1002, while reference pixels included in coding units of the coding unit group GP_2 are invalid reference pixels that are not accessible to the video encoding circuit 1002 due to being discarded after compression.

Figure 17:
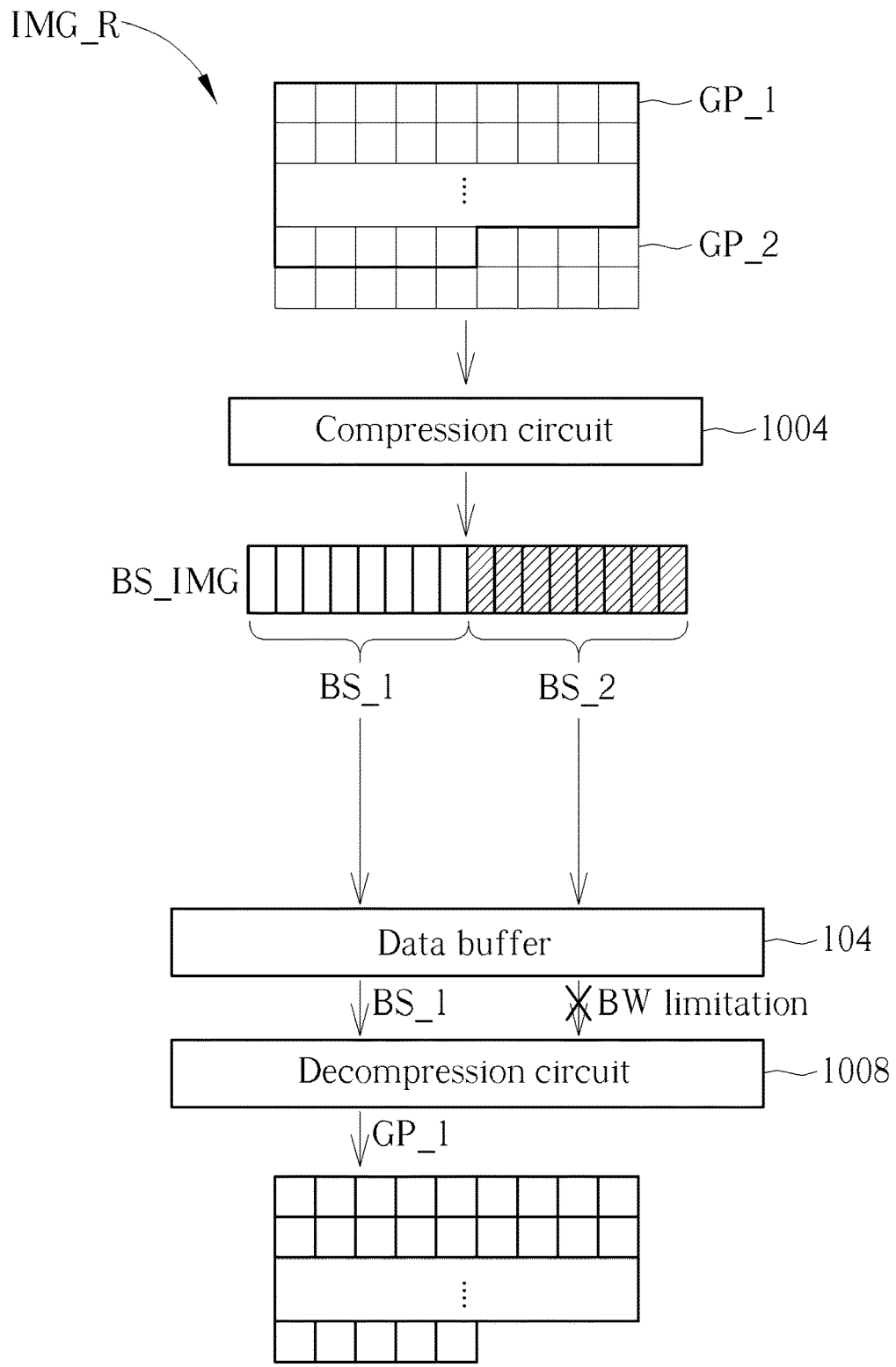
FIG. 17 is a diagram illustrating a fourth example of accessing a data buffer through compression/decompression according to an embodiment of the present invention.

FIG. 17 is a diagram illustrating a fourth example of accessing a data buffer through compression/decompression according to an embodiment of the present invention. In this example, the memory BW limitation is applied on a frame basis. As shown in FIG. 17, the reference frame IMG_R is derived from a reconstructed frame, and includes a plurality of coding units. The compression circuit 1004 applies data compression (e.g., lossless compression) to the reference frame IMG_R to generate an encoded bitstream BS_IMG of the reference frame IMG_R, wherein the first half (i.e., first 50% size) of the encoded bitstream BS_IMG is an encoded bitstream BS_1 of a coding unit group GP_1 consisting of some coding units of the reference frame IMG_R, and the second half (i.e., last 50% size) of the encoded bitstream BS_IMG is an encoded bitstream BS_2 of a coding unit group GP_2 consisting of remaining coding units of the reference frame IMG_R. The encoded bitstream BS_IMG is fully stored into the data buffer 104. The memory BW limitation is applied to the data buffer 104, such that the second half (i.e., last 50% size) of the encoded bitstream BS_IMG is blocked from being read from the data buffer 104 and transmitted to the video encoding circuit 1202. Since the encoded bitstream BS_1 is available in the data buffer 104, the decompression circuit 1008 can read the encoded bitstream BS_1 from the data buffer 104, and can recover the coding unit group GP_1 by applying data decompression to the encoded bitstream BS_1. Hence, reference pixels included in coding units of the coding unit group GP_1 are valid reference pixels that are accessible to the video encoding circuit 1202, while reference pixels included in coding units of the coding unit group GP_2 are invalid reference pixels that are not accessible to the video encoding circuit 1202 due to the memory BW limitation.

Figure 18:
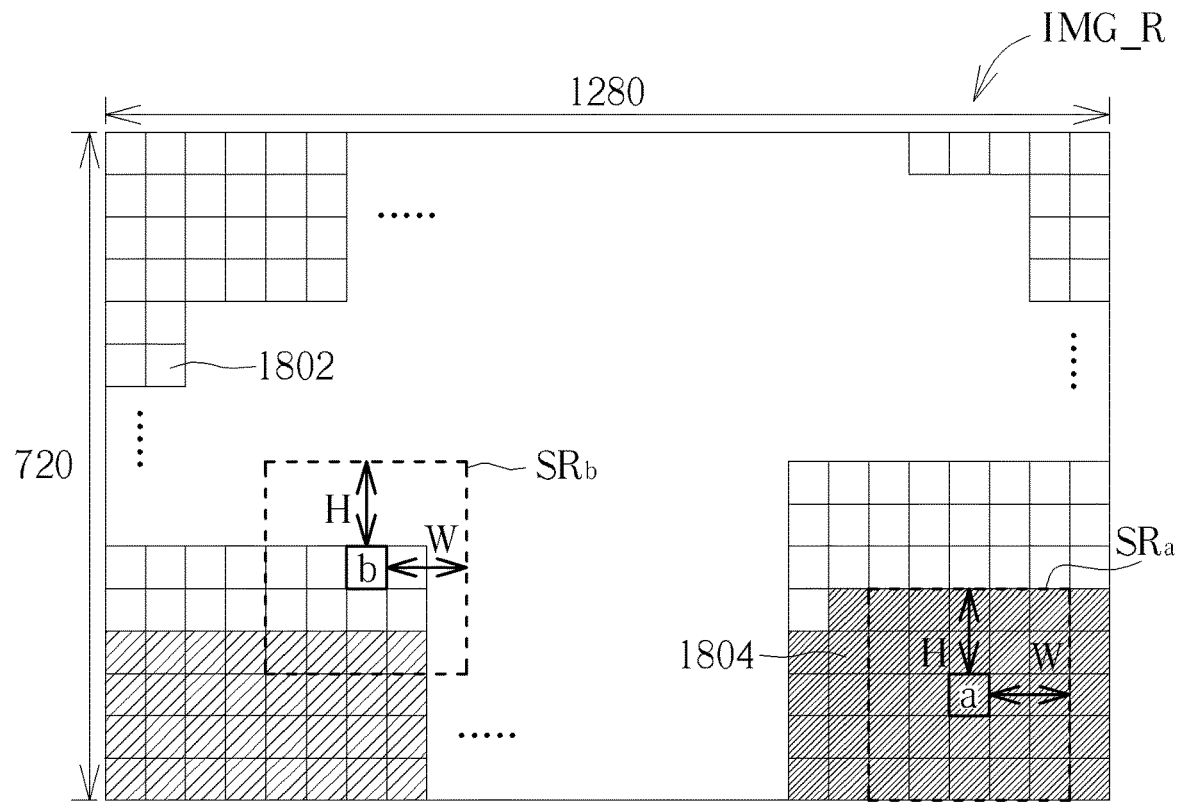
FIG. 18 is a diagram illustrating a fifth example of performing prediction upon coding units to determine target predictors for the coding units according to an embodiment of the present invention.

FIG. 18 is a diagram illustrating a fifth example of performing prediction upon coding units to determine target predictors for the coding units according to an embodiment of the present invention. In this example, the reference frame IMG_R has a resolution of 1280×720, and includes valid reference pixels 1802 and invalid reference pixels 1804. Since the discarding circuit 1006 operates on a frame basis and/or the memory BW limitation is applied to the data buffer 104 on a frame basis, the reference frame IMG_R may have at most one coding unit row that includes at least one valid reference pixel 1802 and at least one invalid reference pixel 1804. In a case where the reference frame IMG_R is generated by the video encoding circuit 1202 shown in FIG. 12, the invalid reference pixels 1804 are reference pixels that are stored in the data buffer 104 after compression but are blocked from being transmitted to the video encoding circuit 1202 due to the memory BW limitation. In another case where the reference frame IMG_R is generated by the video encoding circuit 1002 shown in FIG. 10, the invalid reference pixels 1804 are reference pixels that are not stored in the data buffer 304 after compression due to being discarded by the discarding circuit 1006.

As shown in FIG. 18, all reference pixels within a search range $SR_a$ of a coding unit labeled by 'a' are invalid reference pixels 1804. In accordance with a checking result, the video encoding circuit 1002/1202 forces the target predictor of the coding unit 'a' to be derived from previous reconstructed pixels in a current frame being encoded. Supposing that the coding unit 'a' is the current coding unit 204 shown in FIG. 2, the video encoding circuit 1002/1202 forces the target predictor of the coding unit 'a' to be derived from previous reconstructed pixels 208. For example, the coding mode of the coding unit 'a' is forced to be an intra prediction mode, a Palette mode, or an intra block copy mode.

Figure 19:
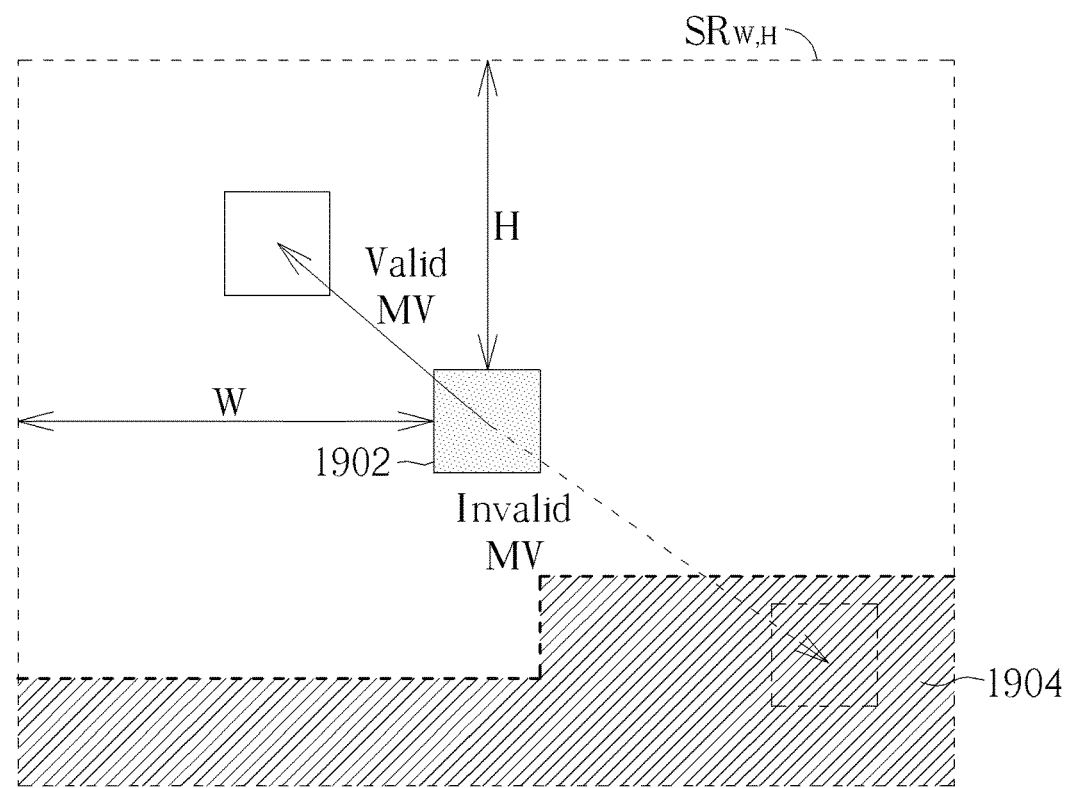
FIG. 19 is a diagram illustrating an example of restricting a motion vector search for a coding unit with a search range on a reference frame shown in FIG. 18.

As shown in FIG. 18, reference pixels within a search range $SR_b$ of a coding unit labeled by 'b' include valid reference pixels 1402 and invalid reference pixels 1404. In accordance with a checking result, the video encoding circuit 1002/1202 finds a predictor of the coding unit 'b' under an inter prediction mode by restricting an MV search to valid reference pixels 1802 only. FIG. 19 is a diagram illustrating an example of restricting an MV search for a coding unit with a search range on the reference frame IMG_R shown in FIG. 18. As shown in FIG. 19, a coding unit 1902 to be encoded has a search range $SR_{W, H}$ on the reference frame IMG_R shown in FIG. 18. For example, the coding unit 1902 may be the coding unit 'b' shown in FIG. 18, and the search range $SR_{W, H}$ may be the search range $SR_b$ shown in FIG. 18. There are invalid reference pixels 1904 within the search range $SR_{W, H}$. Thus, a motion vector is invalid if the derivation of the corresponding predictor includes any invalid reference pixels 1904. Conversely, a motion vector is valid if all of the pixels used for deriving the corresponding predictor are valid reference pixels.

In another alternative design, the discarding circuit 1006 may be arranged to operate on a pixel row basis, and/or the memory BW limitation may be applied to the data buffer 104 on a pixel row basis.

Figure 20:
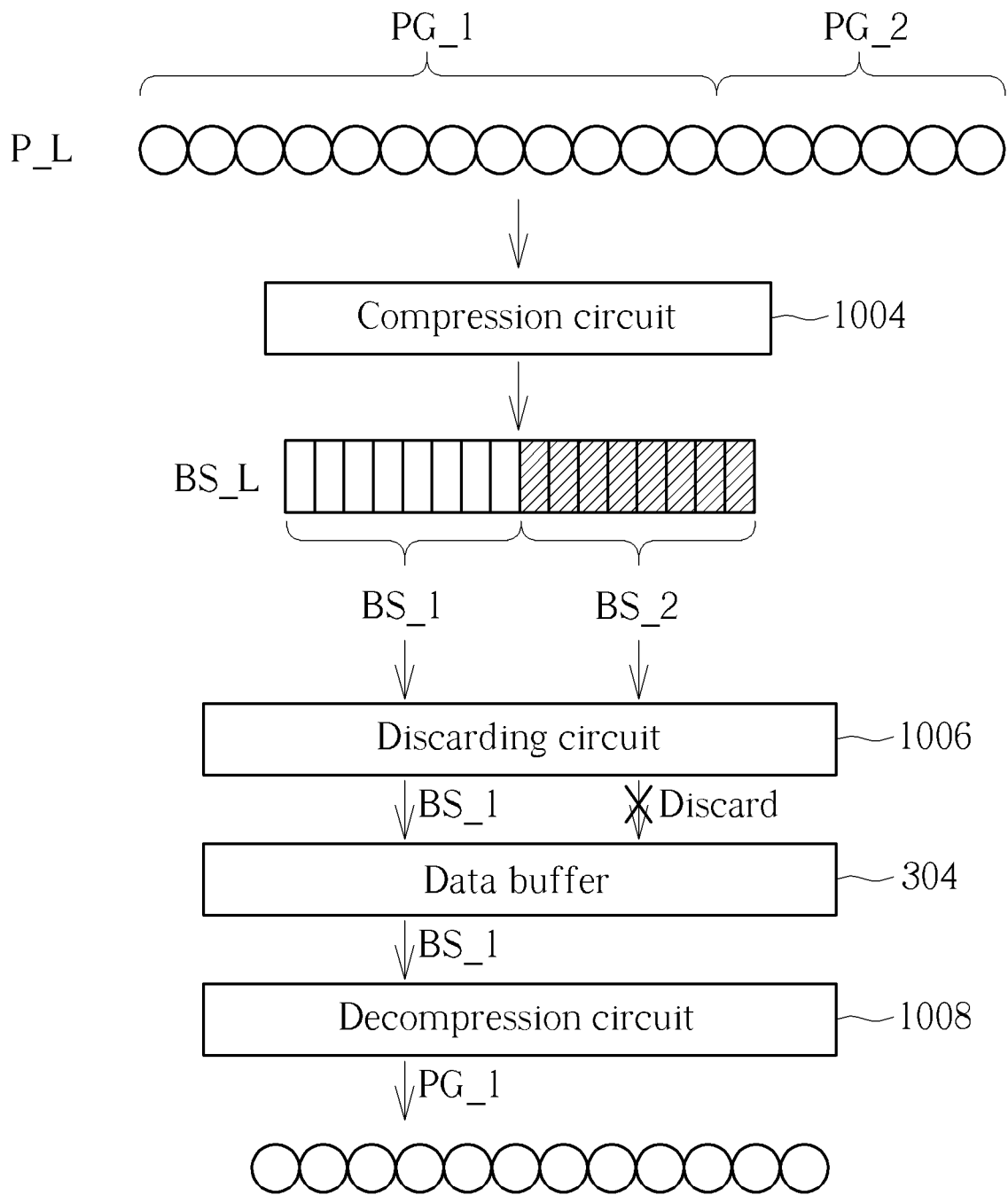
FIG. 20 is a diagram illustrating a fifth example of accessing a data buffer through compression/decompression according to an embodiment of the present invention.

FIG. 20 is a diagram illustrating a fifth example of accessing a data buffer through compression/decompression according to an embodiment of the present invention. In this example, the discarding circuit 1006 is arranged to operate on a pixel row basis. As shown in FIG. 16, one pixel row P_L of a reference frame (which is derived from a reconstructed frame) includes a plurality of pixels. The compression circuit 1004 applies data compression (e.g., lossless compression) to the pixel row P_L to generate an encoded bitstream BS_L of the pixel row P_L, wherein the first half (i.e., first 50% size) of the encoded bitstream BS_L is an encoded bitstream BS_1 of a pixel group PG_1 consisting of some pixels of the pixel row P_L, and the second half (i.e., last 50% size) of the encoded bitstream BS_L is an encoded bitstream BS_2 of a pixel group PG_2 consisting of remaining pixels of the pixel row P_L. In this example, the discarding circuit 1006 discards the second half (i.e., last 50% size) of the encoded bitstream BS_L, such that the encoded bitstream BS_2 of the pixel group PG_2 is not stored into the data buffer 304. Since the encoded bitstream BS_1 is available in the data buffer 304, the decompression circuit 1008 can read the encoded bitstream BS_1 from the data buffer 304, and can recover the pixel group PG_1 by applying data decompression to the encoded bitstream BS_1. Hence, reference pixels included in the pixel group GP_1 are valid reference pixels that are accessible to the video encoding circuit 1002, while reference pixels included in the pixel group PG_2 are invalid reference pixels that are not accessible to the video encoding circuit 1002 due to being discarded after compression.

Figure 21:
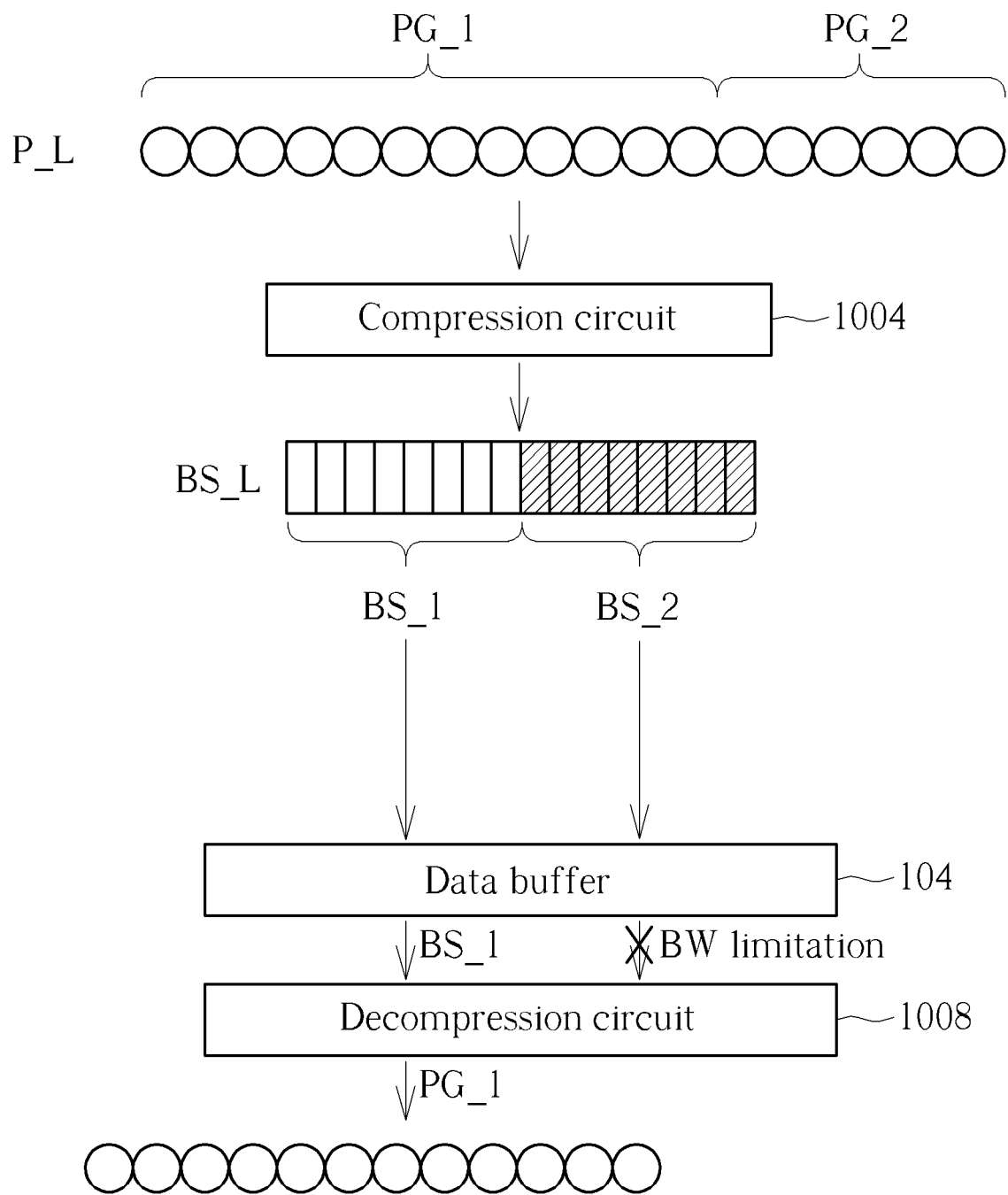
FIG. 21 is a diagram illustrating a sixth example of accessing a data buffer through compression/decompression according to an embodiment of the present invention.

FIG. 21 is a diagram illustrating a sixth example of accessing a data buffer through compression/decompression according to an embodiment of the present invention. In this example, the memory BW limitation is applied on a pixel row basis. As shown in FIG. 21, one pixel row P_L of a reference frame (which is derived from a reconstructed frame) includes a plurality of pixels. The compression circuit 1004 applies data compression (e.g., lossless compression) to the pixel row P_L to generate an encoded bitstream BS_L of the pixel row P_L, wherein the first half (i.e., first 50% size) of the encoded bitstream BS_L is an encoded bitstream BS_1 of a pixel group PG_1 consisting of some pixels of the pixel row P_L, and the second half (i.e., last 50% size) of the encoded bitstream BS_L is an encoded bitstream BS_2 of a pixel group PG_2 consisting of remaining pixels of the pixel row P_L. In this example, the encoded bitstream BS_L is fully stored into the data buffer 104. The memory BW limitation is applied to the data buffer 104, such that the second half (i.e., last 50% size) of the encoded bitstream BS_L is blocked from being read from the data buffer 104 and transmitted to the video encoding circuit 1202. Since the encoded bitstream BS_1 is available in the data buffer 104, the decompression circuit 1008 can read the encoded bitstream BS_1 from the data buffer 104, and can recover the pixel group PG_1 by applying data decompression to the encoded bitstream BS_1. Hence, reference pixels included in the pixel group PG_1 are valid reference pixels that are accessible to the video encoding circuit 1202, while reference pixels included in the pixel group PG_2 are invalid reference pixels that are not accessible to the video encoding circuit 1202 due to the memory BW limitation.

Figure 22:
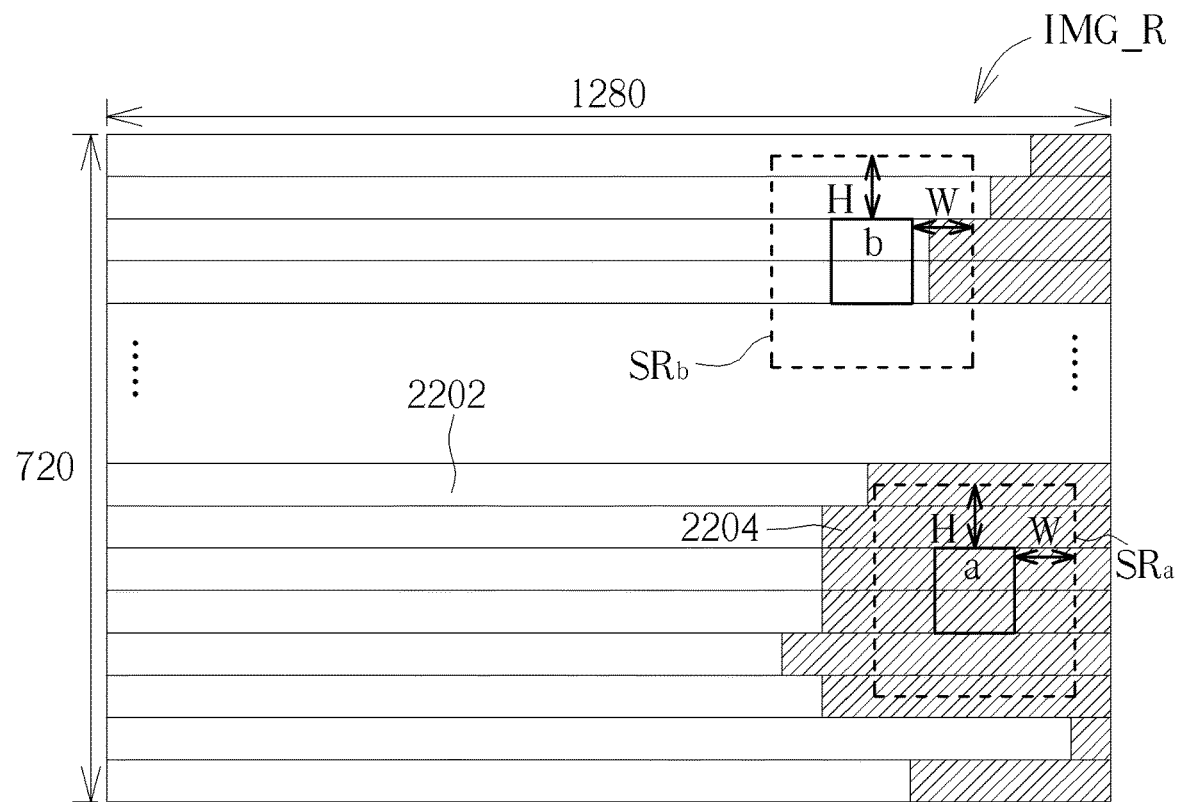
FIG. 22 is a diagram illustrating a sixth example of performing prediction upon coding units to determine target predictors for the coding units according to an embodiment of the present invention.

FIG. 22 is a diagram illustrating a sixth example of performing prediction upon coding units to determine target predictors for the coding units according to an embodiment of the present invention. In this example, the reference frame IMG_R has a resolution of 1280×720, and includes valid reference pixels 2202 and invalid reference pixels 2204. Since the discarding circuit 1006 operates on a pixel row basis and/or the memory BW limitation is applied to the data buffer 104 on a pixel row basis, the number of invalid reference pixels in each pixel row is not fixed due to the fact that a losslessly compressed bitstream of each pixel row does not have a fixed size. In a case where the reference frame IMG_R is generated by the video encoding circuit 1202 shown in FIG. 12, the invalid reference pixels 2204 are reference pixels that are stored in the data buffer 104 after compression but are blocked from being transmitted to the video encoding circuit 1202 due to the memory BW limitation. In another case where the reference frame IMG_R is generated by the video encoding circuit 1002 shown in FIG. 10, the invalid reference pixels 2204 are reference pixels that are not stored in the data buffer 304 after compression due to being discarded by the discarding circuit 1006.

As shown in FIG. 22, all reference pixels within a search range $SR_a$ of a coding unit labeled by 'a' are invalid reference pixels 2204. In accordance with a checking result, the video encoding circuit 1002/1202 forces the target predictor of the coding unit 'a' to be derived from previous reconstructed pixels in a current frame being encoded. Supposing that the coding unit 'a' is the current coding unit 204 shown in FIG. 2, the video encoding circuit 1002/1202 forces the target predictor of the coding unit 'a' to be derived from previous reconstructed pixels 208. For example, the coding mode of the coding unit 'a' is forced to be an intra prediction mode, a Palette mode, or an intra block copy mode.

Figure 23:
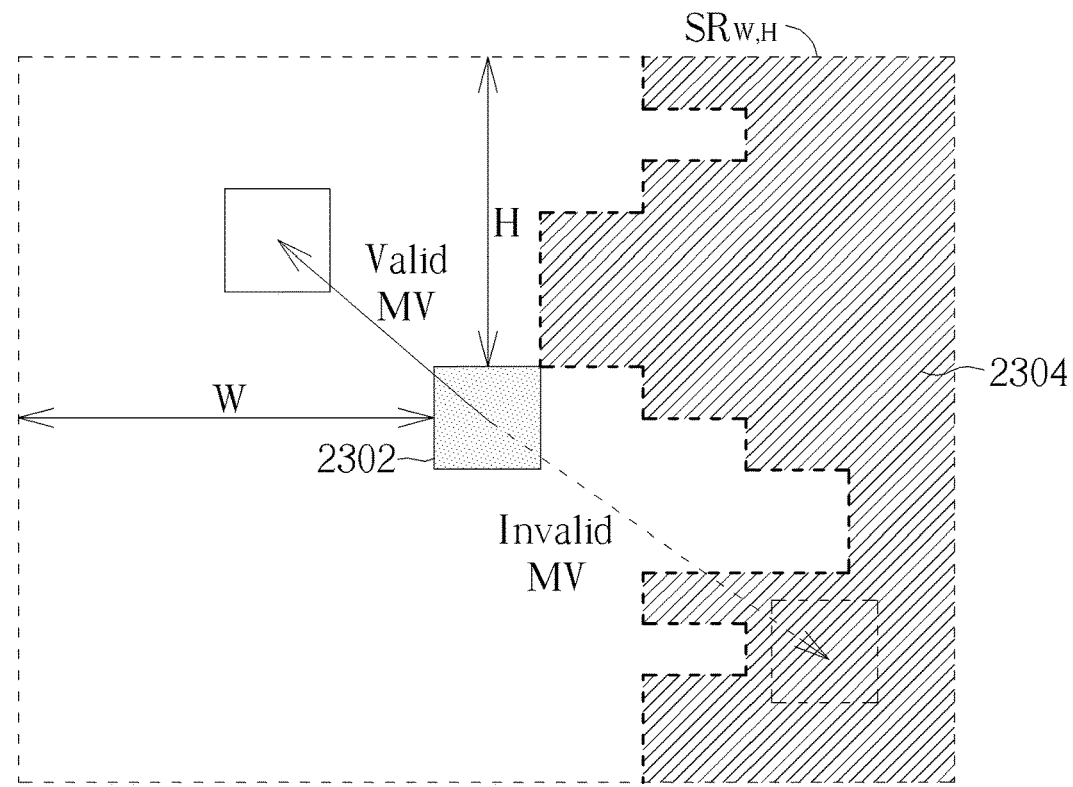
FIG. 23 is a diagram illustrating an example of restricting a motion vector search for a coding unit with a search range on a reference frame shown in FIG. 22.

As shown in FIG. 22, reference pixels within a search range $SR_b$ of a coding unit labeled by 'b' include valid reference pixels 2202 and invalid reference pixels 2204. In accordance with a checking result, the video encoding circuit 1002/1202 finds a predictor of the coding unit 'b' under an inter prediction mode by restricting an MV search to valid reference pixels 2202 only. FIG. 23 is a diagram illustrating an example of restricting an MV search for a coding unit with a search range on the reference frame IMG_R shown in FIG. 22. As shown in FIG. 23, a coding unit 2302 to be encoded has a search range $SR_{W,H}$ on the reference frame IMG_R shown in FIG. 22. There are invalid reference pixels 2304 within the search range $SR_{W,H}$. Thus, a motion vector is invalid if the derivation of the corresponding predictor includes any invalid reference pixels 2304. Conversely, a motion vector is valid if all of the pixels used for deriving the corresponding predictor are valid reference pixels.

As mentioned above, the data buffer 304 (which acts as a reconstruction/reference buffer) may be implemented with an SRAM. Hence, the size of the data buffer 304 is fixed, regardless of the resolution of the input source frame. The present invention further proposes applying pre-discarding before compression. Hence, the data buffer 304 is allowed to have a smaller size.

Figure 24:
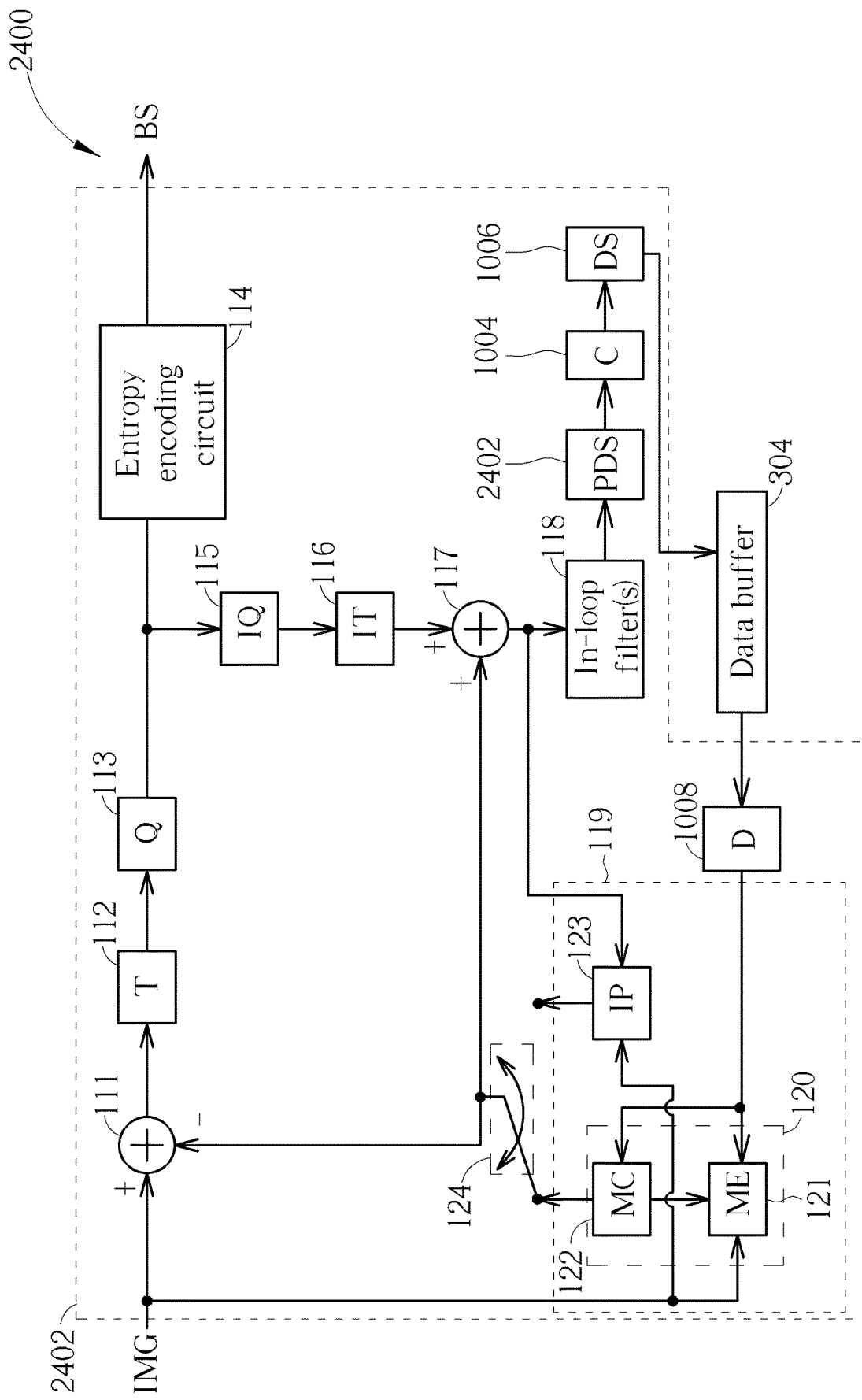
FIG. 24 is a diagram illustrating a fifth video encoding apparatus according to an embodiment of the present invention.

FIG. 24 is a diagram illustrating a fifth video encoding apparatus according to an embodiment of the present invention. The major difference between the video encoding apparatuses 2400 and 1000 is that a video encoding circuit 2402 of the video encoding apparatus 2400 includes a pre-discarding circuit (denoted by "PDS") 2402 that is coupled between the in-loop filter 118 and the compression circuit 1004. It should be noted that the architecture of the video encoding circuit 2402 shown in FIG. 24 is for illustrative purposes only, and is not meant to be a limitation of the present invention. Reference pixels of a reference frame are derived from reconstructed pixels of the input source frame IMG. In this embodiment, the pre-discarding circuit 2402 is arranged to discard reference pixels belonging to a portion of the reference frame, and output reference pixels belonging to a remaining portion of the reference frame to the compression circuit 1004.

Reference pixel data are stored into the data buffer 304 that acts as a reconstruction/reference buffer, where the reference pixel data include information of pixel values of the reference pixels belonging to the remaining portion of the reference frame (i.e., reference pixels in the reference frame that are not discarded by the pre-discarding circuit 2402). Since the compression circuit 1004 is located between the pre-discarding circuit 2402 and the data buffer 304, the reference pixel data in the data buffer 304 are stored in a compressed format. Specifically, the compression circuit 1004 generates an encoded bitstream of the reference pixel data by applying data compression to the pixel values of the reference pixels belonging to the remaining portion of the reference frame, and stores the encoded bitstream of the reference pixel data into the data buffer 304. For example, a lossless compression scheme is employed by the compression circuit 1004. The decompression circuit 1008 can retrieve a portion of the encoded bitstream of the reference pixel data from the data buffer 304, and can obtain a portion of the reference pixel data by applying data decompression to the portion of the encoded bitstream of the reference pixel data. Hence, the video encoding circuit 2402 (particularly, inter prediction circuit 120) may refer to the portion of the reference pixel data provided from the decompression circuit 1008 to find a predictor of a coding unit under an inter prediction mode.

Due to pre-discarding of reference pixels in a reference frame, the compression circuit 1004 applies data compression (e.g., lossless compression) to a partial reference frame. However, it is possible that the size of the compressed partial reference frame may still be larger than that of the data buffer 304. In this embodiment, an encoded bitstream of one or more reference pixels of the partial reference frame is discarded by the discarding circuit 1006 without being stored into the data buffer 304 that has a fixed size smaller than the size of the compressed partial reference frame. In other words, reference pixels of the partial reference frame that are compressed and then stored in the data buffer 304 are only a part of the partial reference frame. Hence, the reference frame includes valid reference pixels that are stored in the data buffer 304 after pre-discarding and compression and are accessible to the video encoding circuit 1002 via the decompression circuit 1008, and further includes invalid reference pixels that are not accessible to the video encoding circuit 1002 due to either being pre-discarded by the pre-discarding circuit 2402 before compression or being discarded by the discarding circuit 1006 after compression.

In this embodiment, the video encoding circuit 2402 (particularly, prediction circuit 119) performs prediction upon the current coding unit 204 in the second frame IMG2 shown in FIG. 2 to determine a target predictor for the current coding unit 204. Since one or more reference pixels of the partial reference frame that are not stored in the data buffer 304 after compression are invalid reference pixels, the video encoding circuit 2402 (particularly, prediction circuit 119) generates a checking result by checking if the search range $SR_{W,H}$ on the reference frame IMG_R for finding a predictor of the current coding unit 204 under an inter prediction mode includes at least one reference pixel of the reference frame IMG_R that is not accessible to the video encoding circuit 2402, and determines the target predictor for the current coding unit 204 according to the checking result.

Figure 25:
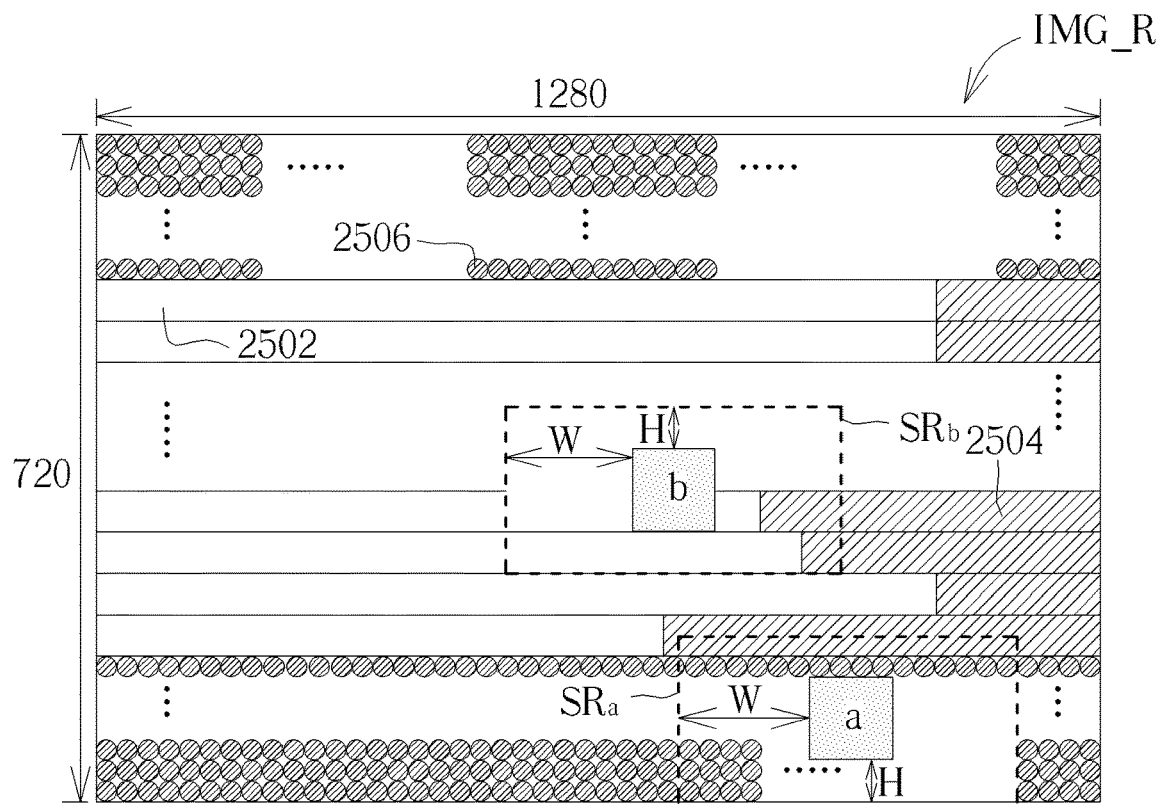
FIG. 25 is a diagram illustrating a seventh example of performing prediction upon coding units to determine target predictors for the coding units according to an embodiment of the present invention.

FIG. 25 is a diagram illustrating a seventh example of performing prediction upon coding units to determine target predictors for the coding units according to an embodiment of the present invention. In this example, the reference frame IMG_R has a resolution of 1280×720, and includes valid reference pixels 2502 and invalid reference pixels 2504, 2506. In a case where the reference frame IMG_R is generated by the video encoding circuit 2402 shown in FIG. 24, the invalid reference pixels 2506 are reference pixels that are not received by the compression circuit 1004 due to being pre-discarded by the pre-discarding circuit 2402, and the invalid pixels 2504 are reference pixels that are not stored in the data buffer 304 after compression due to being discarded by the discarding circuit 1006. In this example, the discarding circuit 1006 operates on a pixel row basis. Hence, the number of invalid reference pixels in each pixel row is not fixed due to the fact that a losslessly compressed bitstream of each pixel row does not have a fixed size.

As shown in FIG. 25, all reference pixels within a search range $SR_a$ of a coding unit labeled by 'a' are invalid reference pixels, including invalid reference pixels 2504 and invalid reference pixels 2506. In accordance with a checking result, the video encoding circuit 2402 forces the target predictor of the coding unit 'a' to be derived from previous reconstructed pixels in a current frame being encoded. Supposing that the coding unit 'a' is the current coding unit 204 shown in FIG. 2, the video encoding circuit 2402 forces the target predictor of the coding unit 'a' to be derived from previous reconstructed pixels 208. For example, the coding mode of the coding unit 'a' is forced to be an intra prediction mode, a Palette mode, or an intra block copy mode.

Figure 26:
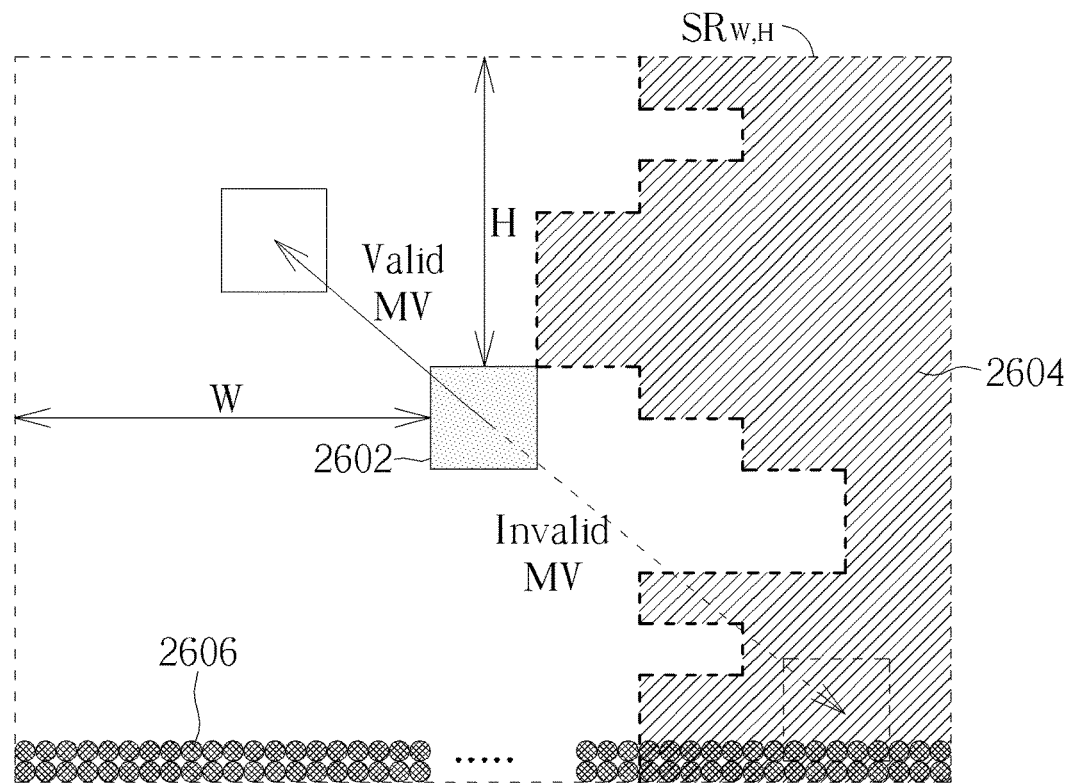
FIG. 26 is a diagram illustrating an example of restricting a motion vector search for a coding unit with a search range on a reference frame shown in FIG. 25.

As shown in FIG. 25, reference pixels within a search range $SR_b$ of a coding unit labeled by 'b' include valid reference pixels 2502 and invalid reference pixels 2504. In accordance with a checking result, the video encoding circuit 2402 finds a predictor of the coding unit 'b' under an inter prediction mode by restricting an MV search to valid reference pixels 2502 only. FIG. 26 is a diagram illustrating an example of restricting an MV search for a coding unit with a search range on the reference frame IMG_R shown in FIG. 25. As shown in FIG. 26, a coding unit 2602 to be encoded has a search range $SR_{W, H}$ on the reference frame IMG_R shown in FIG. 25. There are invalid reference pixels 2604 and 2606 within the search range $SR_{W, H}$. For example, the invalid reference pixels 2604 may be a part of the invalid reference pixels 2504 shown in FIG. 25, and the invalid reference pixels 2606 may be a part of the invalid reference pixels 2506 shown in FIG. 25. Thus, a motion vector is invalid if the derivation of the corresponding predictor includes any invalid reference pixels 2604/2606. Conversely, a motion vector is valid if all of the pixels used for deriving the corresponding predictor are valid reference pixels.

In above examples shown in FIGS. 4, 6, and 8, 50% of a reference frame is not accessible to a video encoding circuit. In above examples shown in FIG. 11, 50% of an encoded bitstream 11, 13, 16, 17, 20, and 21, 50% of an encoded bitstream is not accessible to a video encoding circuit. However, these are for illustrative purposes only, and are not meant to be limitations of the present invention. In practice, a discarding threshold may be set by a percentage value that is different from 50%. That is, the discarding threshold may be adjusted, depending up actual implementation considerations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video encoding apparatus comprising:
   a data buffer; and
   a video encoding circuit, arranged to encode a plurality of frames into a bitstream, wherein each frame comprises a plurality of coding units, each coding unit comprises a plurality of pixels, the frames comprise a first frame and a second frame, encoding of the first frame comprises:
      deriving a plurality of reference pixels of a reference frame from a plurality of reconstructed pixels of the first frame, respectively; and
      storing reference pixel data into the data buffer for inter prediction, wherein the reference pixel data comprise information of pixel values of the reference pixels; and
   encoding of the second frame comprises:
      performing prediction upon a coding unit in the second frame to determine a target predictor for the coding unit, comprising:
         generating a checking result by checking if a search range on the reference frame for finding a predictor of the coding unit under an inter prediction mode includes at least one reference pixel of the reference frame that is not accessible to the video encoding circuit; and
         determining the target predictor for the coding unit according to the checking result;
      wherein the checking result indicates that one part of reference pixels within the search range are accessible to the video encoding circuit and another part of reference pixels within the search range are not accessible to the video encoding circuit, and the video encoding circuit finds the predictor of the coding unit under the inter prediction mode by restricting a motion vector search to said one part of reference pixels within the search range only.

2. The video encoding apparatus of claim 1, wherein the video encoding circuit directly stores the pixel values of the reference pixels into the data buffer to act as the reference pixel data.

3. The video encoding apparatus of claim 2, wherein a size of the data buffer is smaller than a size of the reference frame, the reference pixels are only a part of the reference frame, and the video encoding circuit comprises:
   a discarding circuit, arranged to discard said at least one reference pixel of the reference frame, such that said at least one reference pixel is not stored into the data buffer.

4. The video encoding apparatus of claim 2, wherein said at least one reference pixel is a part of the reference pixels; and according to a bandwidth limitation applied to the data buffer, said at least one reference pixel is blocked from being read from the data buffer and transmitted to the video encoding circuit.

5. The video encoding apparatus of claim 1, wherein the video encoding circuit comprises:
   a compression circuit, arranged to generate an encoded bitstream of the reference pixel data by applying data compression to the pixel values of the reference pixels, wherein the encoded bitstream of the reference pixel data is stored into the data buffer.

6. The video encoding apparatus of claim 5, wherein a lossless compression scheme is employed by said data compression.

7. The video encoding apparatus of claim 5, wherein a size of the data buffer is smaller than a size of a compressed reference frame derived from applying said data compression to the reference frame, the reference pixels are only a part of the reference frame, and the video encoding circuit comprises:
   a discarding circuit, arranged to discard an encoded bitstream of said at least one reference pixel of the reference frame, such that the encoded bitstream of said at least one reference pixel is not stored into the data buffer.

8. The video encoding apparatus of claim 5, wherein said at least one reference pixel is a part of the reference pixels; and according to a bandwidth limitation applied to the data buffer, an encoded bitstream of said at least one reference pixel is blocked from being read from the data buffer and transmitted to the video encoding circuit.

9. The video encoding apparatus of claim 5, wherein the reference pixels are one part of the reference frame, and the video encoding circuit further comprises:
   a pre-discarding circuit, arranged to discard reference pixels belonging to another part of the reference frame, such that the reference pixels belonging to said another part of the reference frame are not fed into the compression circuit.

10. The video encoding apparatus of claim 9, wherein said at least one reference pixel is a part of the reference pixels belonging to said another part of the reference frame.

11. A video encoding method for encoding a plurality of frames into a bitstream, each frame comprising a plurality of coding units, each coding unit comprising a plurality of pixels, the video encoding method comprising:
  encoding a first frame included in the frames, comprising:
    deriving a plurality of reference pixels of a reference frame from a plurality of reconstructed pixels of the first frame, respectively; and
    storing reference pixel data into a data buffer for inter prediction, wherein the reference pixel data comprise information of pixel values of the reference pixels; and
  encoding a second frame included in the frames, comprising:
    performing prediction upon a coding unit in the second frame to determine a target predictor for the coding unit, comprising:
      generating, by a video encoding circuit, a checking result by checking if a search range on the reference frame for finding a predictor of the coding unit under an inter prediction mode includes at least one reference pixel of the reference frame that is not accessible to the video encoding circuit; and
      determining the target predictor for the coding unit according to the checking result;
    wherein the checking result indicates that one part of reference pixels within the search range are accessible to the video encoding circuit and another part of reference pixels within the search range are not accessible to the video encoding circuit, and determining the target predictor for the coding unit according to the checking result comprises:
    finding the predictor of the coding unit under the inter prediction mode by restricting a motion vector search to said one part of reference pixels within the search range only.

12. The video encoding method of claim 11, wherein the pixel values of the reference pixels are directly stored into the data buffer to act as the reference pixel data.

13. The video encoding method of claim 12, wherein a size of the data buffer is smaller than a size of the reference frame, the reference pixels are only a part of the reference frame, and encoding the first frame included in the frames further comprises:
  discarding said at least one reference pixel of the reference frame, such that said at least one reference pixel is not stored into the data buffer.

14. The video encoding method of claim 12, wherein said at least one reference pixel is a part of the reference pixels, and encoding the second frame included in the frames further comprises:
  according to a bandwidth limitation applied to the data buffer, blocking said at least one reference pixel from being read from the data buffer for transmission.

15. The video encoding method of claim 11, wherein storing the reference pixel data into the data buffer for inter prediction comprises:
  generating an encoded bitstream of the reference pixel data by applying data compression to the pixel values of the reference pixels; and
  storing the encoded bitstream of the reference pixel data into the data buffer.

16. The video encoding method of claim 15, wherein a lossless compression scheme is employed by said data compression.

17. The video encoding method of claim 15, wherein a size of the data buffer is smaller than a size of a compressed reference frame derived from applying said data compression to the reference frame, the reference pixels are only a part of the reference frame, and encoding the first frame included in the frames further comprises:
  discarding an encoded bitstream of said at least one reference pixel of the reference frame, such that the encoded bitstream of said at least one reference pixel is not stored into the data buffer.

18. The video encoding method of claim 15, wherein said at least one reference pixel is a part of the reference pixels, and encoding the second frame included in the frames further comprises:
  according to a bandwidth limitation applied to the data buffer, blocking an encoded bitstream of said at least one reference pixel from being read from the data buffer for transmission.

19. The video encoding method of claim 15, wherein the reference pixels are one part of the reference frame, and encoding the first frame included in the frames further comprises:
  discarding reference pixels belonging to another part of the reference frame, such that the reference pixels belonging to said another part of the reference frame are not processed by said data compression.

20. The video encoding method of claim 19, wherein said at least one reference pixel is a part of the reference pixels belonging to said another part of the reference frame.

* * * * *